INVENTORS
RICHARD J. BAUMGARTNER
MILTON F. BOND
BY Donald F. Voss
ATTORNEY

Sept. 1, 1970 R. J. BAUMGARTNER ET AL 3,526,876

CHARACTER SEPARATION APPARATUS FOR CHARACTER RECOGNITION MACHINES

Filed Oct. 24, 1965 9 Sheets-Sheet 2

Sept. 1, 1970 R. J. BAUMGARTNER ET AL 3,526,876

CHARACTER SEPARATION APPARATUS FOR CHARACTER RECOGNITION MACHINES

Filed Oct. 24, 1965 9 Sheets-Sheet 3

Sept. 1, 1970 R. J. BAUMGARTNER ET AL 3,526,876

CHARACTER SEPARATION APPARATUS FOR CHARACTER RECOGNITION MACHINES

Filed Oct. 24, 1965 9 Sheets-Sheet 4

CHARACTER SEPARATION APPARATUS FOR CHARACTER RECOGNITION MACHINES

Filed Oct. 24, 1965

Sept. 1, 1970 R. J. BAUMGARTNER ET AL 3,526,876

CHARACTER SEPARATION APPARATUS FOR CHARACTER RECOGNITION MACHINES

Filed Oct. 24, 1965 9 Sheets-Sheet 7

Sept. 1, 1970 R. J. BAUMGARTNER ET AL 3,526,876

CHARACTER SEPARATION APPARATUS FOR CHARACTER RECOGNITION MACHINES

Filed Oct. 24, 1965 9 Sheets-Sheet 8

United States Patent Office 3,526,876

Patented Sept. 1, 1970

3,526,876

CHARACTER SEPARATION APPARATUS FOR CHARACTER RECOGNITION MACHINES

Richard J. Baumgartner and Milton F. Bond, Rochester, Minn., assignors to International Business Machines Corporation, Armonk, N.Y., a corporation of New York Filed Oct. 24, 1965, Ser. No. 504,457
Int. Cl. G06k 9/00
U.S. Cl. 340—146.3 17 Claims

ABSTRACT OF THE DISCLOSURE

Apparatus is provided for generating end-of-character and invalid character signals for a multi-font character recognition machine. Character pitch measurements are made by character pairs. The character pitch data is utilized for partitioning each character space into areas. Logical tests are made in each area to determine when the character has been completely scanned. If any one of the tests is met, and end-character signal is generated. If all tests fail, then the end-of-character signal is developed on the basis of the pitch. A look-ahead storage register enables certain logic tests to be made for touching and/or overhanging character parts and enables the end-of-character signal to activate the character recognition circuits before confusion data can enter the main storage register which is used for recognition purposes.

This invention relates to apparatus for determining when one character of adjacent characters has been completely scanned and more particularly to apparatus for providing control signals to character recognition apparatus indicating what information should be considered by the character recognition apparatus.

In character recognition machines, the character to be recognized is transformed into some type of electrical signal or waveform which is then analyzed for the purpose of identifying the unknown character. Thus, the unknown character is recognized according to the information gathered. Obviously, if recognition is based upon information unrelated to the unknown character, an erroneous decision will be made. Consequently, there is a requirement that only information concerning the unknown character will be analyzed by the recognition apparatus and even though within limits the formation of the character has been modified by missing or additional elements. There is also a requirement for ascertaining that a valid character has been encountered. Smudges or any other extraneous marks must be eliminated from consideration by the recognition apparatus. Additionally, it is necessary to separate touching characters so far as the recognition apparatus is concerned. Hence, although touching characters are not physically separated, the information content derived for recognition purposes is limited to a single character.

These requirements impose the need to determine when a valid character has been encountered. Further, in the event adjacent characters cannot be separated logically, a forced separation is made. However, in order to force separation it is advantageous to know the pitch of the characters. The character pitch will vary in multi-font character recognition machines and hence it is necessary to provide apparatus for determining pitch. Knowledge of the character pitch is also useful in normalizing the width of the characters and in recognition thereof. Along with knowing the pitch of characters, it is possible to divide the character space into different areas and make tests within the various areas to determine if the character has been completely scanned. Each test is designed to provide an end of character signal only if the test conditions are satisfied at the proper time which can be on time or late with respect to the character space areas. By having a plurality of tests, the probability of one of the tests developing an end of character signal is greater.

Accordingly, it is a prime object of the invention to provide improved apparatus for determining when one character of adjacent characters has been completely scanned.

Another very important object of the invention is to provide apparatus which can determine when a valid character has been encountered.

Still another very important object of the invention is to provide apparatus which will gather information limited to a single character of a pair of touching characters.

Yet another object of the invention is to provide apparatus which will eliminate smudges or any other extraneous marks surrounding a character from consideration by the apparatus for recognizing a character.

Still another very important object of the invention is to provide apparatus for determining character pitch.

A further important object of the invention is to provide apparatus which divides character spaces into areas and provides tests within these areas for determining if a character has been completely scanned, the tests being designed to provide an end of character signal only if the test conditions are satisfied at the proper time.

Another important object of the invention is to provide apparatus which determines when a blank character space has been scanned.

The foregoing and other objects, features and advantages of the invention will be apparent from the following more particular description of preferred embodiments of the invention, as illustrated in the accompanying drawings.

Figure 1:
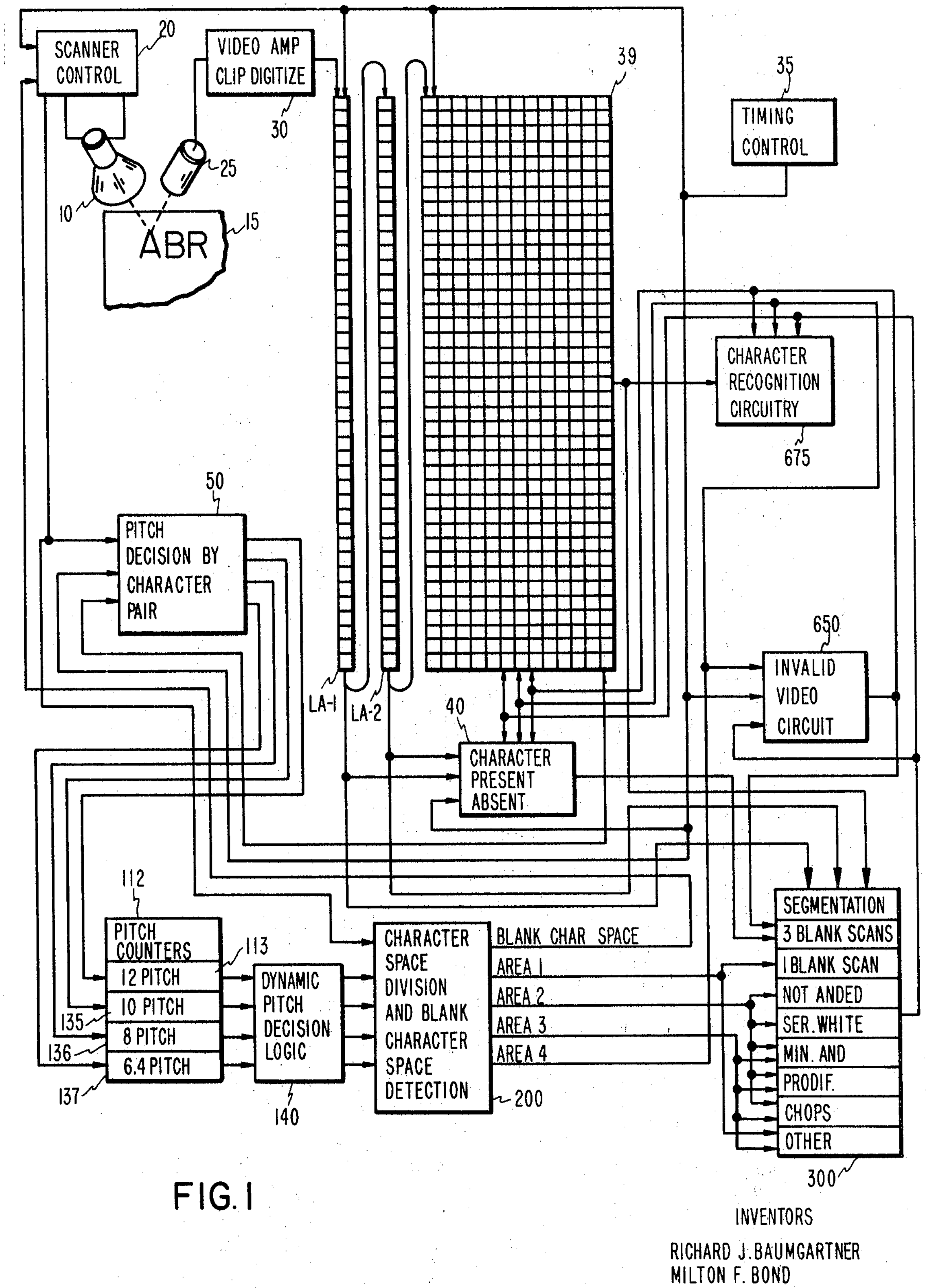
FIG. 1 is a schematic logic diagram illustrating an optical character reading machine embodying the invention.
Figures 2, 4:
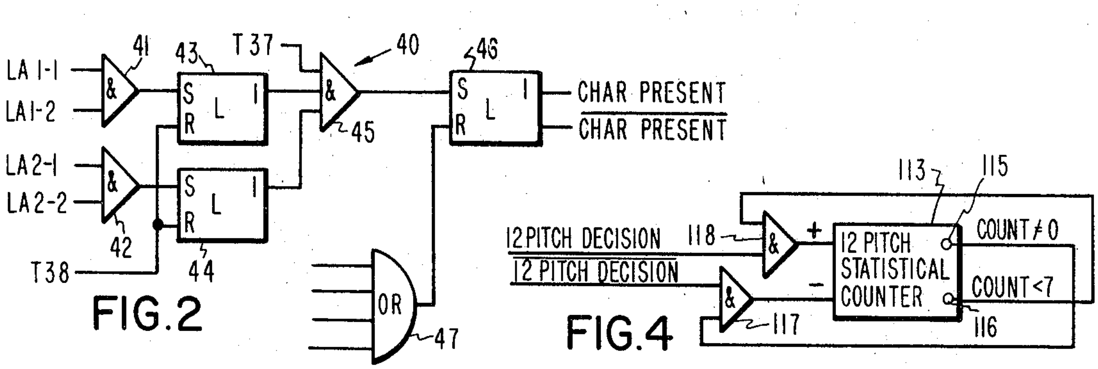
FIG. 2 is a detailed logic diagram for the Character Present and Absent circuit of FIG. 1.
Figure 5:
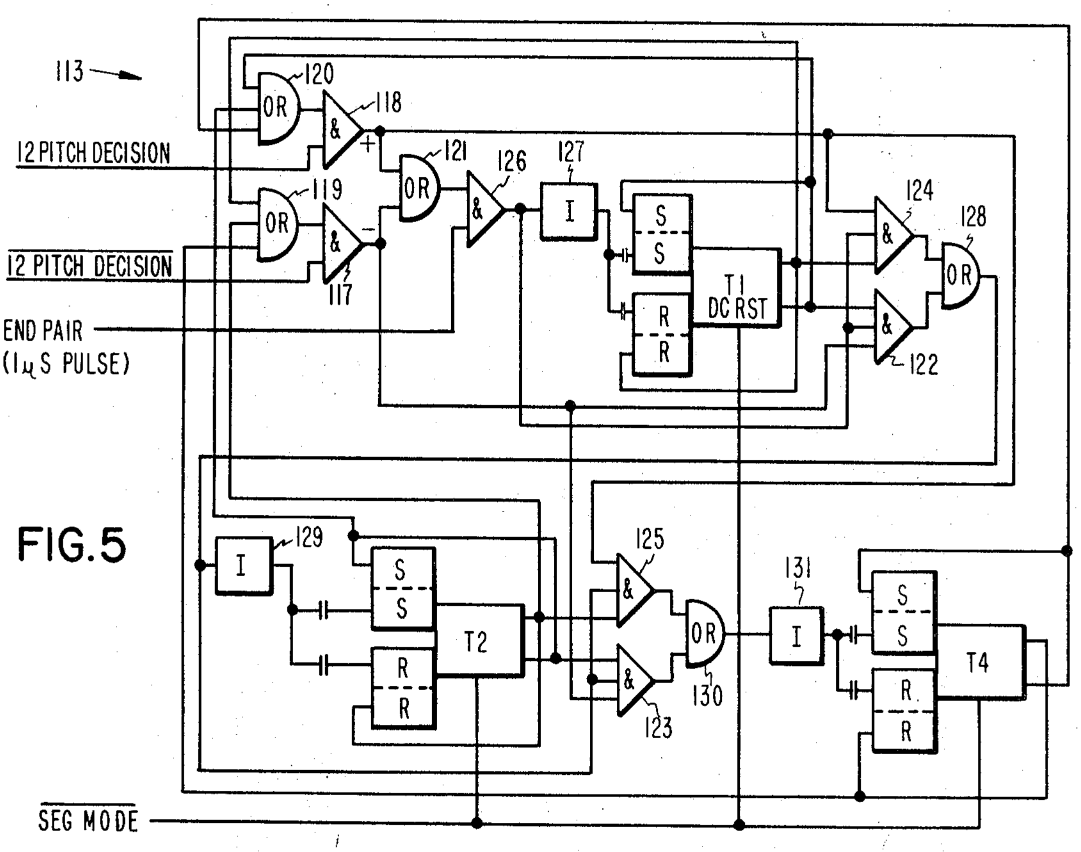
Figure 6:
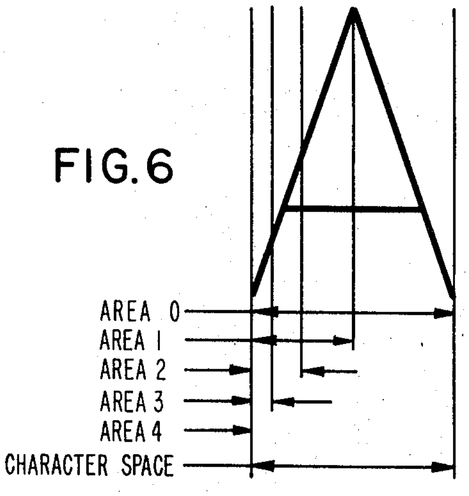
Figure 7:
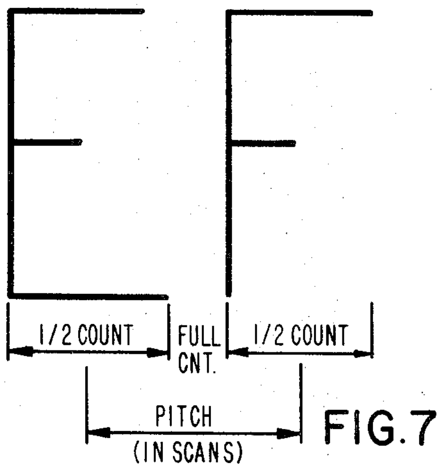
Figure 8:
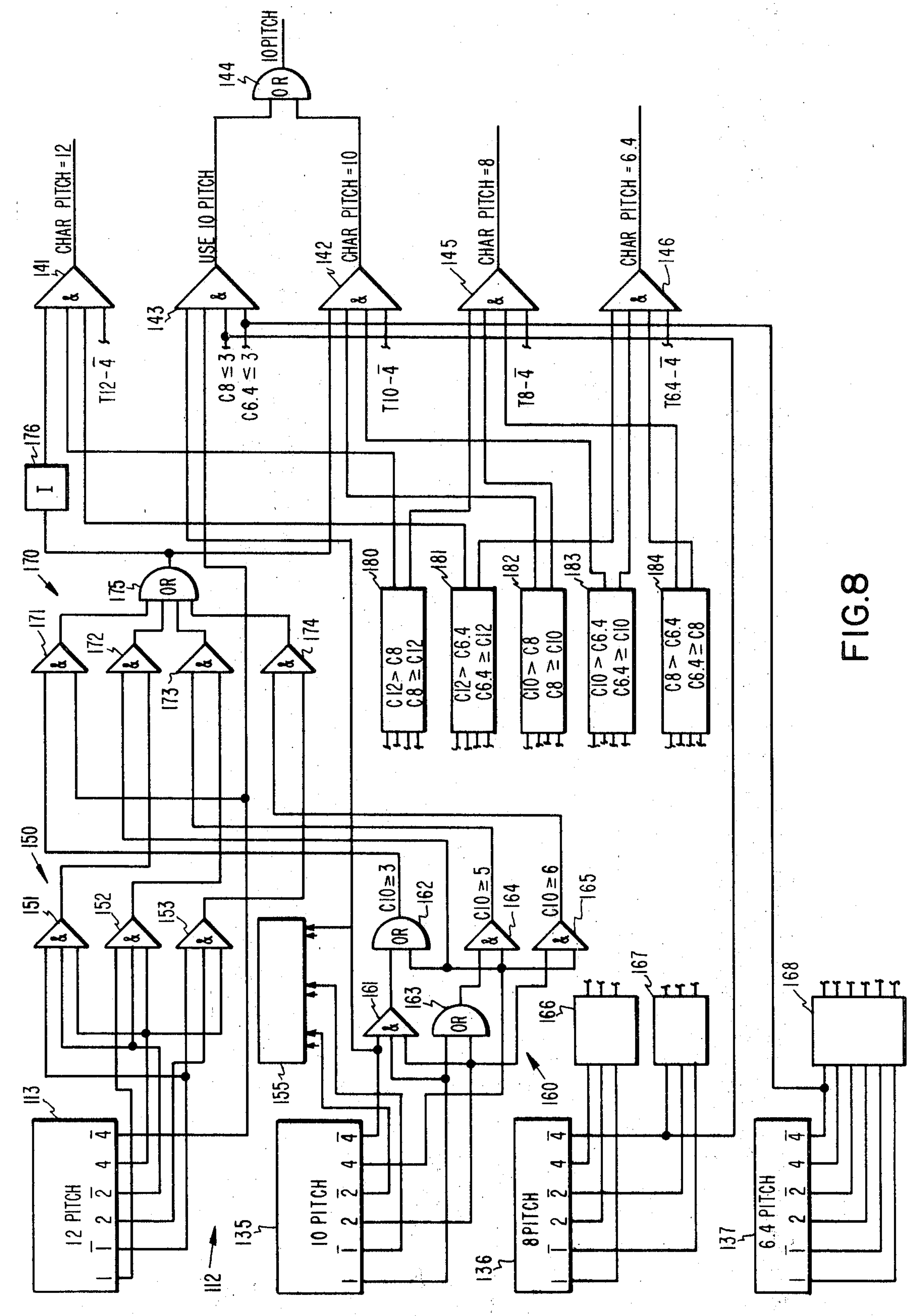
Figure 9:
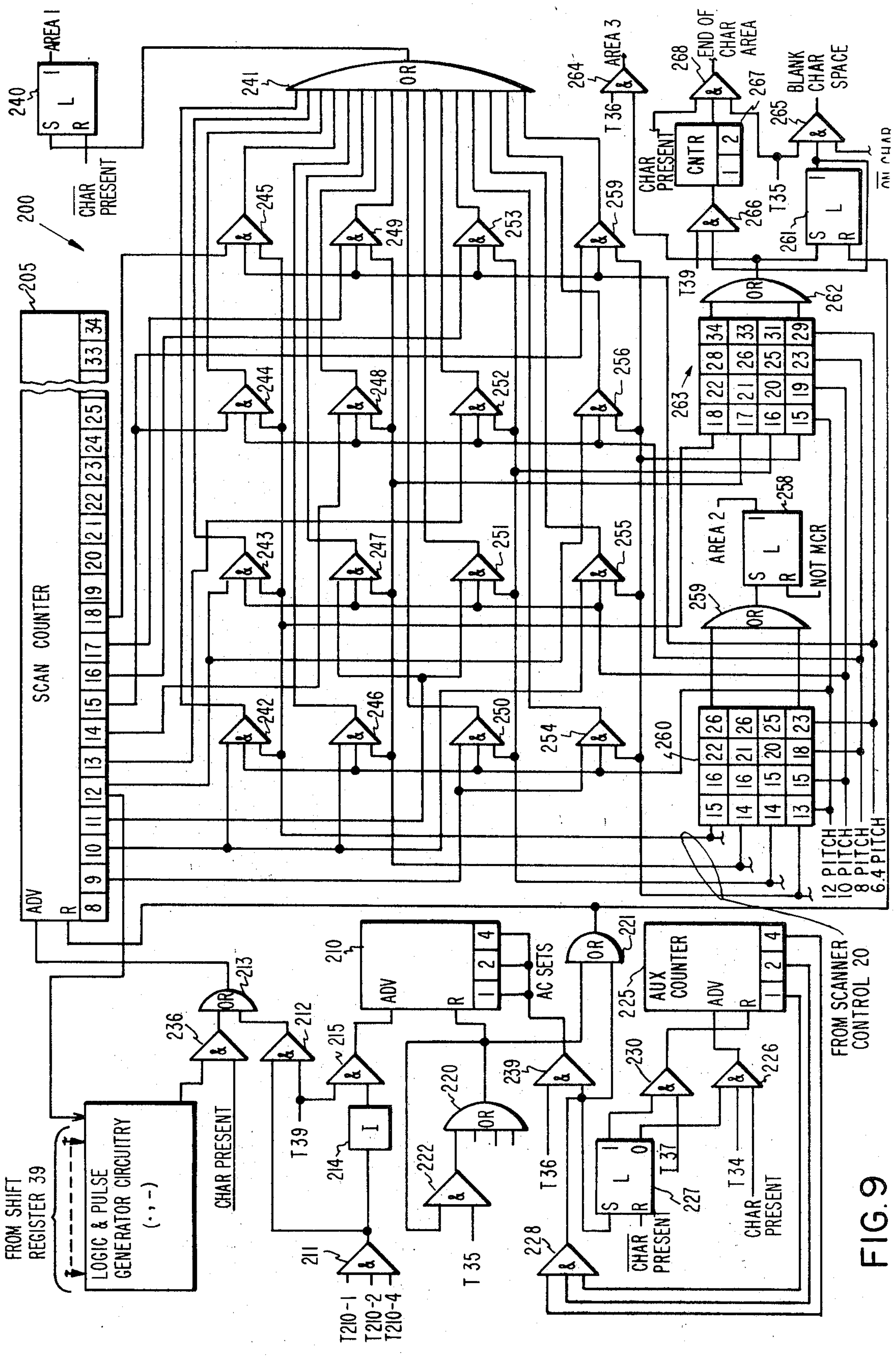
Figures 10, 11, 12:
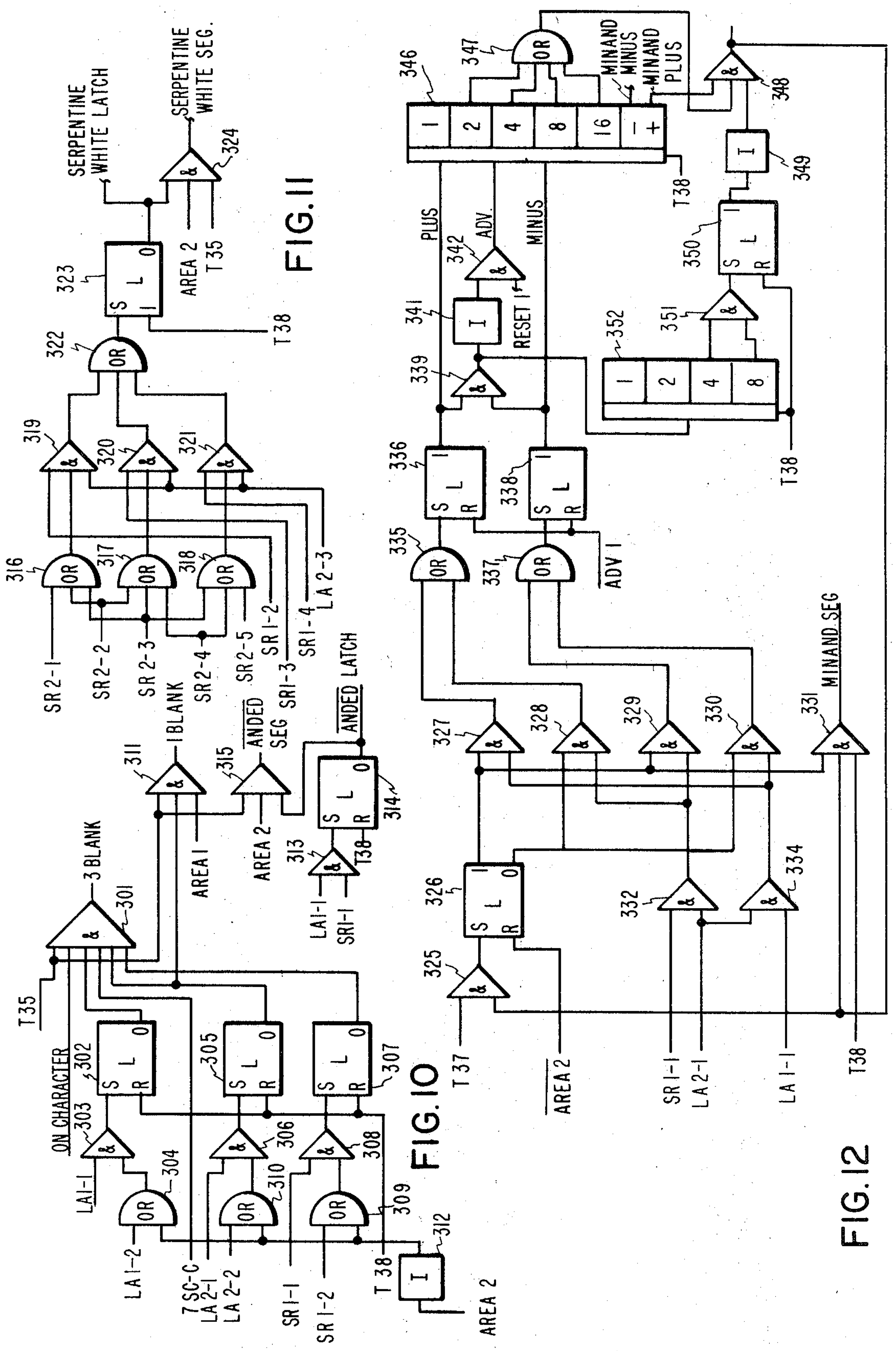
Figure 13:
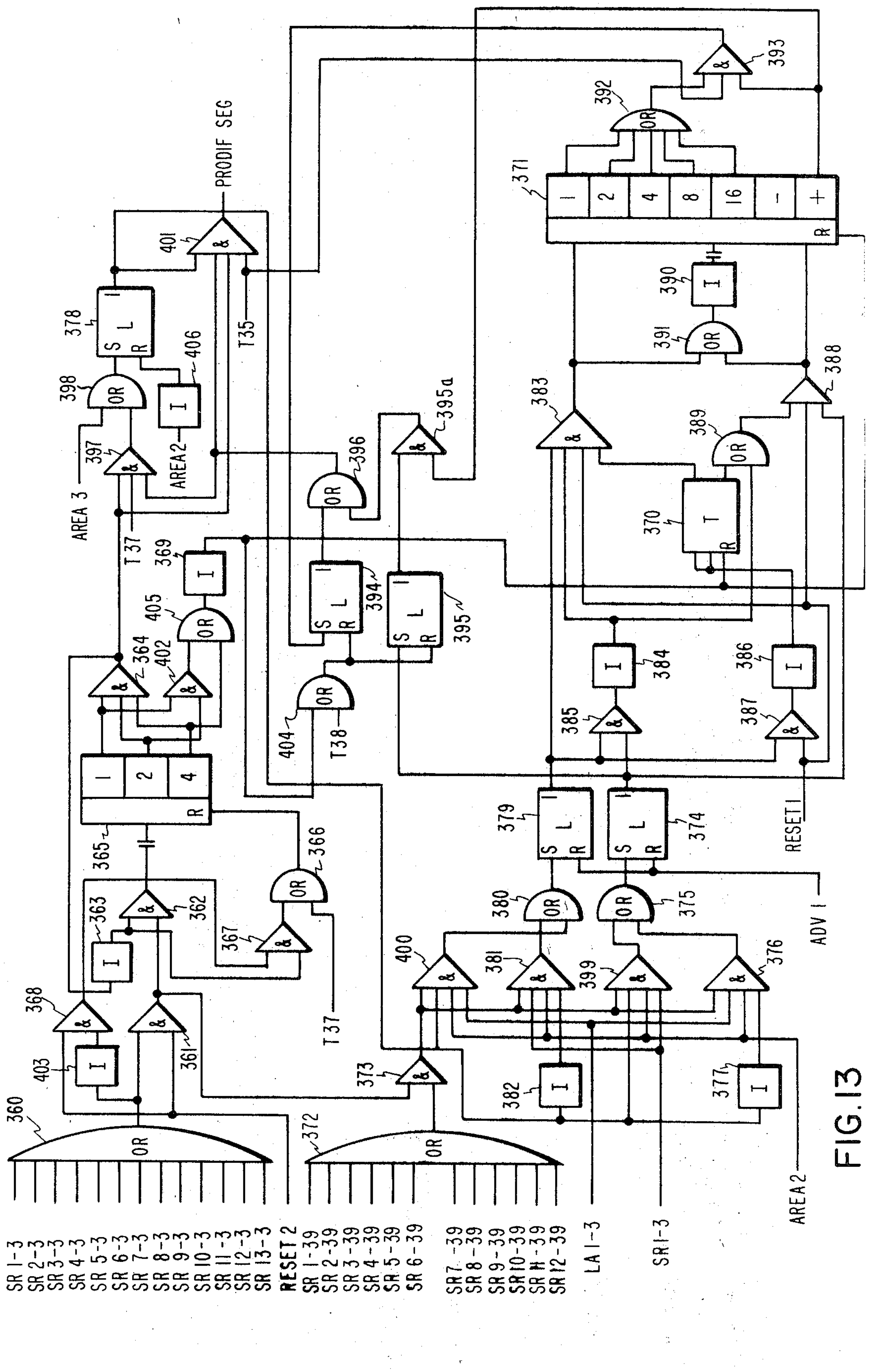
Figure 14:
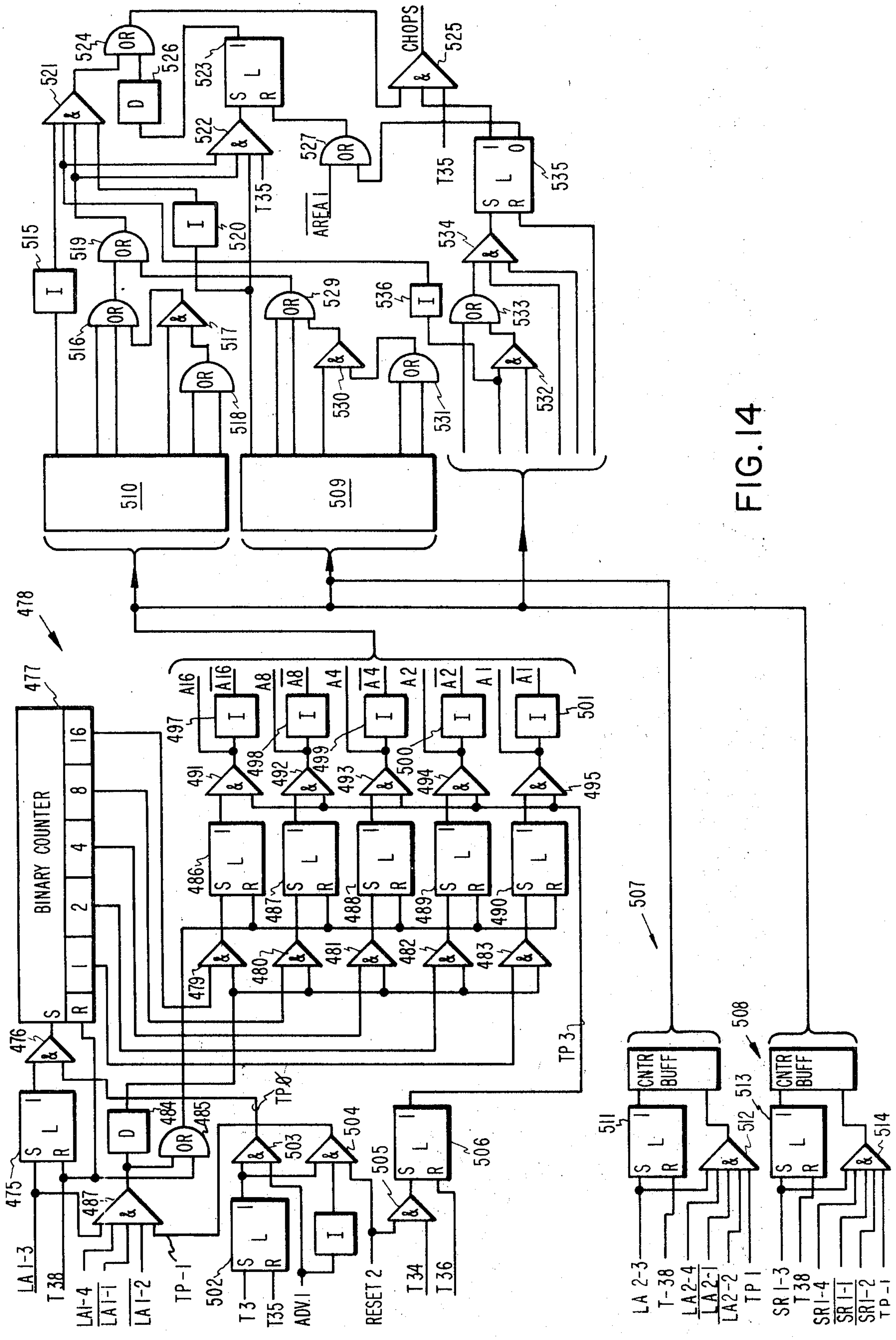
Figure 15:
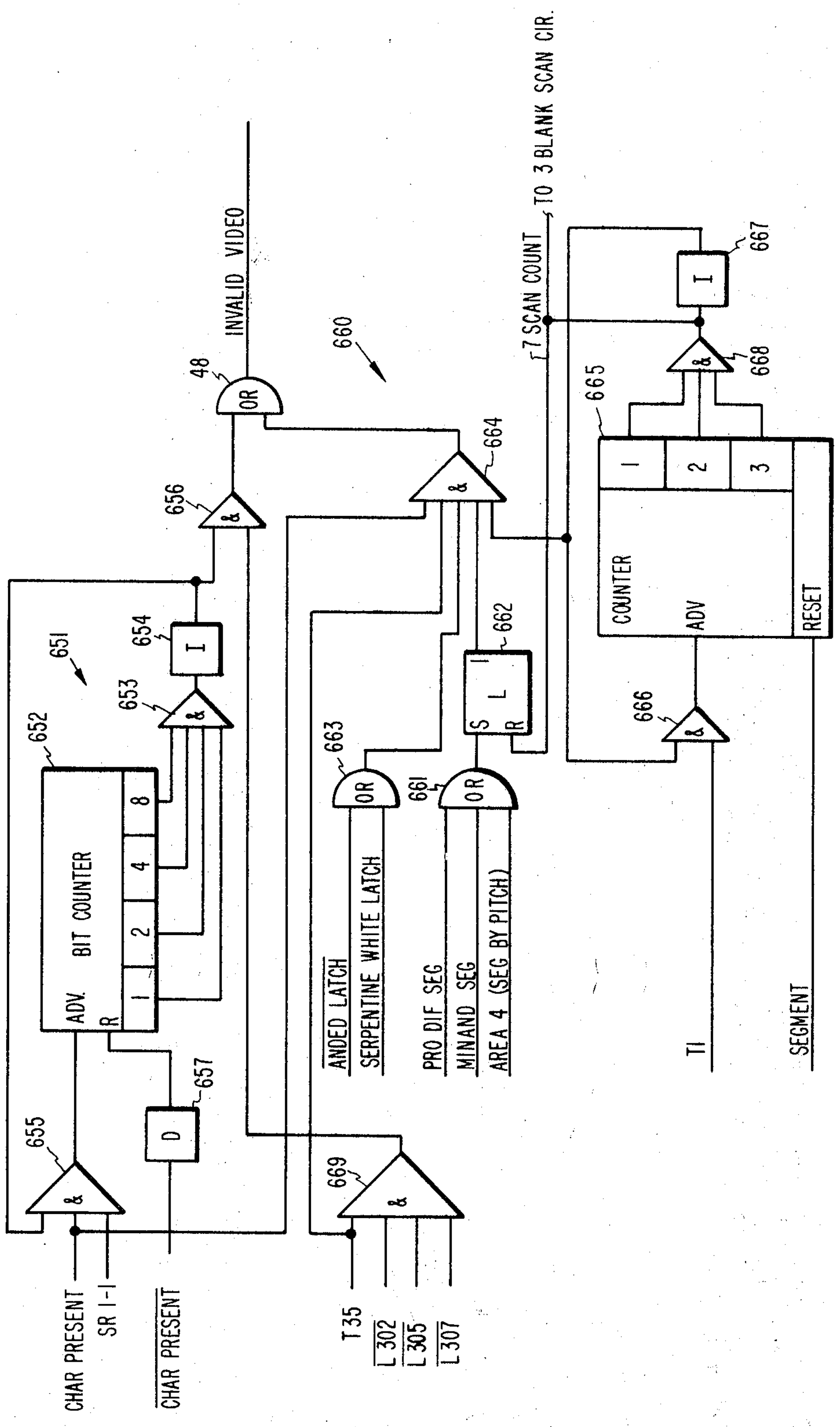

FIG. 4, sheet 2, is a schematic diagram of a typical pitch counter of the pitch counters shown in block form in FIG. 1;

FIG. 5, sheet 2, is a detailed logic diagram of a typical pitch counter for the pitch counters shown in FIG. 1;

FIG. 6, sheet 2, is a schematic showing of a character space divided into areas;

FIG. 7, sheet 2, is a schematic diagram showing a pair of characters and illustrating how the pitch distance is determined by scan count;

FIG. 8 is a detailed circuit diagram of the Dynamic Pitch Decision Logic circuitry shown in block form in FIG. 1;

FIG. 9 is a detailed logic diagram of the Character Space Division and Blank Character Space Detection circuitry shown in block form in FIG. 1;

FIG. 10 is a detailed logic diagram of the Three Blank Scan, One Blank Scan, and Not ANDED segmentation logic circuits shown in block form in FIG. 1;

FIG. 11 is a detailed logic diagram of the Serpentine White segmentation circuit shown in block form in FIG. 1;

FIG. 12 is a detailed logic diagram of the MINAND segmentation circuit shown in block form in FIG. 1;

FIG. 13 is a detailed logic diagram of the Prodif segmentation circuit shown in block form in FIG. 1;

FIG. 14 is a detailed logic diagram of the Chops segmentation circuit shown in block form in FIG. 1; and, FIG. 15 is a detailed logic diagram of the Invalid Video circuit shown in block form in FIG. 1.

GENERAL

With reference to the drawings and particularly to FIG. 1, the invention is shown by way of example as being incorporated into a character recognition machine which includes a conventional cathode ray tube 10 for scanning characters on document 15. The document 15 is stationary while being read. The movement of the beam of the cathode ray tube is controlled by scanner control apparatus 20. In this particular example, the characters on a line are scanned continuously, i.e., one after the other, starting at the right hand side of a character and proceeding to the left from the bottom to the top of a character. After one vertical scan of the character, the beam flies back angularly downward to the left as it is deflected both horizontally and vertically and then makes another vertical scan from the bottom to the top.

As the characters are scanned, the beam of the cathode ray tube is reflected from document 15 to photomultiplier tube 25. The amount of light reflected from a character is generally substantially less than that reflected from the background area of the document 15. Photomultiplier tube 25 is activated by the reflected light and essentially develops a signal at one level due to the light reflected by a character and develops a signal at another level from the light reflected by the background area. The signals are both analog in amplitude and time and are termed the video signal. The video signal is then amplified and digitized in both amplitude and time by circuitry 30. In this particular example, the analog signal developed as the result of each vertical scan is digitized into 32 increments. The amount of time for flyback equals 7 increments. The amplitude of the signal at each of the 32 increments will be at one of the two levels depending upon the optical condition at the particular time of scanning. If a certain amount of a portion of a character is engaged by the beam during one of the 32 increments of a vertical scan, then the optical condition is said to be black and the signal amplitude will be at a "one" level. If none or only a very small part of a portion of a character is engaged, the optical condition is considered white and the signal amplitude will be at a "zero" level. The clipping and contrast circuit 30 determines if the optical condition for a particular segment is black or white. The segments of a vertical scan and flyback are determined by control circuit 35 which provides the proper timing signals.

The digitized video data from circuit 30 is entered into look-ahead register LA–1 under control of circuit 35. The digitized video data is then shifted from LA–1 through LA–2 and entered into shift register 39 under control of circuit 35. The video digitized data in shift register 39 is then examined by the character recognition circuitry 675 which can be of the type shown and described in patent application Ser. No. 490,244 by Jack F. Bene et al., for Reference Selection Apparatus for Cross Correlation, filed Sept. 27, 1965, and assigned to the same assignee as the present invention. However, in this particular invention, the character recognition circuitry considers only the data entered into register 39 from the time of a previous reset of the register until the time a valid segmentation signal is received.

The valid segmentation signal initiates recognition of the character just scanned. It is recognized that characters are not all of the same pitch even on the same document and they are not evenly spaced. Therefore, in this invention, actual pitch measurements are made and the character space is divided into several areas and tests are made within these areas to determine if the character has been completely scanned. Each test is essentially a segmentation logic circuit which is designed to provide an End of Character or Segmentation signal only if the test conditions are satisfied at the proper time. Further, if none of the test conditions are satisfied, then the character is segmented on the basis of pitch. This is also considered to be a forced segmentation. It should be noted that a segmentation logic becomes active only in a proper area of a character space; however, once it is activated, it remains active for the entire character space or area.

In this invention, the various segmentation logic circuits include the Three Blank Scan segmentation logic circuit. This segmentation circuit can develop a Segmentation signal in any area of the character space. The conditions of this segmentation circuit are met when three consecutive scans have a maximum of one bit in each scan. The One Blank scan segmentation circuit is activated in Area 2. The conditions of this circuit are met when a scan is encountered after the circuit has been activated which contains a maximum of one bit. The NOT ANDED segmentation circuit is activated in Area 2 and the conditions of this segmentation circuit are met if a bit in position 1 of look-ahead register LA2 is not present simultaneously with a bit in position 1 of the first column of the shift register 39, during an entire scan. The Serpentine White segmentation circuit is activated in Area 2 and it functions to see if there is a continuous white path over a span of three scans. The Minand segmentation circuit is normaly activated in Area 2 and forced activation takes place at Area 3 if the same were not activated for some reason in Area 2. The conditions of this segmentation circuit are met when there is a predetermined minimum difference between two values developed by counting the number of adjacent bits in adjacent scans of the look-ahead registers LA1 and LA2 and the number of adjacent bits in adjacent scans in look-ahead register LA2 and the first column of the shift register 39. The Prodif segmentation circuit is normally activated in Area 2 and forced activation takes place at Area 3. In satisfying the conditions of this segmentation circuit, the right side of the next character is detected in the look-ahead register LA1. This requires that a ratio of black bits counted in LA–1 to the number of black bits in the first column of shift register 39 be at least two to one and if no bits are counted in the first column of the shift register 39, the count of black bits in LA–1 must be at least 2 and the black bits in the top and bottom three rows of the character pattern in shift register 39 are not counted. The Chops segmentation circuit is activated in Area 1 by a height count of at least 15 bits. Segmentation occurs when the height count is a minimum in the first column of shift register 39. The minimum height count is determined by comparing the height count in the first column in shift register 39 with the height counts in look-ahead registers LA–1 and LA–2. Segmentation cannot occur unless the minimum height count is below a predetermined number.

In order to develop any type of segmentation signal, it is first necessary to determine that a character is or is not being scanned. This determination is made by the Character Present and Absent circuitry 40. In this particular example, a Character Present signal is developed when two vertically adjacent bits are found in two horizontally adjacent scans. The Character Present signal is a starting condition for entering data into the shift register 39, for developing a Segmentation signal, and for developing an Invalid Character signal if the proper conditions exist. Further, in order to develop the Segmentation signals, it is necessary to know the pitch of the characters being scanned and this is accomplished by means of the Pitch Decision by Character Pairs circuit 50, the Pitch Counters 110 and the Dynamic Pitch Decision logic 140. Once the character pitch is known, the character space is divided into the various areas and blank character spaces are detected by circuitry 200. Circuitry 200 provides the Areas signals and the Blank character space signal to the Segmentation Logic 300. The Segmentation Logic 300 provides Segmentation signals to the Character Recognition Circuitry 675 to the shift register 39 and to the Character Present and Absent circuitry 40. It should be noted that the Segmentation by Pitch signal or forced segmentation is provided from circuit 200 to the Character Recognition Circuitry 675, the shift register 39 and circuit 40.

It is also recognized in this invention that in many instances there are smudges, defects in the paper, etc. which will result in digitized video data which should not be considered by the Character Recognition circuitry. This video data sometimes is defined as junk or invalid character indication. However, it appears more appropriate to call this type of video data as invalid video data. If the video data is invalid, the Invalid Video circuit 650 develops a signal and shift register 39 is reset and the Character Recognition circuitry 675 is signalled that the data in the register should not be considered for recognition purposes.

This completes the general description of the invention and a detailed description of the various circuits will now be given.

DETAILED DESCRIPTION

Character present and absent circuitry

The character present and absent circuitry 40, FIG. 2, provides an indication that a character is or is not being scanned. Essentially this circuitry provides signals indicating that a sufficient amount of video data has or has not been encountered. In this particular example, a character present signal is developed when two vertically adjacent bits are found in two horizontally adjacent scans. The character present signal is a starting condition for entering data into the shift register 39, for developing a segmentation signal, and for developing an invalid character signal.

Positions 1 and 2 from look ahead registers LA1 and LA2 are connected to inputs of logical AND circuits 41 and 42, respectively. But the input conditions to logical AND circuit 41 and 42 are satisfied only when there are adjacent bits in positions 1 and 2 of the look ahead registers LA1 and LA2. The outputs of logical AND circuits 41 and 42 are connected to the set inputs of latches 43 and 44, respectively. The set outputs of latches 43 and 44 are connected to inputs of a logical AND circuit 45 also having an input from control 35 for receiving a T37 timing signal. The output of logical AND circuit 45 is connected to the set input of latch 46. When latch 46 is set, it provides a signal indicative that a character is present. The reset output of latch 46 provides a signal indicating that a character is not present. The reset input of latch 46 is connected to the output of a logical OR circuit 47 which has an input connected to the output of a logical OR circuit 48, FIG. 15, an input connected to the output of an inverter 52, an input connected to the output of a logical AND circuit 268 and an input connected to the output of logical OR circuit 54. Thus, latch 46 is reset whenever some type of end of character criteria has been satisfied. It should be noted that the end of character signals occur at T35 time and the signal for setting latch 46 occurs at T37 time and therefore latch 46 can be reset and set within the same scan. Thus the character present signal is generated by the same input conditions without regard to whether or not the previous character touches the one under consideration.

Character pitch determination

Character Pitch is the distance from the centerline of one character to the centerline of an adjacent character. While the pitch can be determined from pairs of characters, the distance between center lines of a single pair of characters may not always indicate the correct pitch. Hence, in this invention a plurality of pitch measurements are made and the pitch measurement occurring most often is selected as the correct pitch measurement. The distance between centerlines is measured by counting one-half the number of scans required to scan each character of the pair and counting the number of scans required to scan the area between the characters of the pair. Of course, the same distance could be derived by counting the number of scans required to scan each character of the pair and counting twice the number of scans required to scan the area between characters of the pair and dividing this value by 2.

Figure 3:
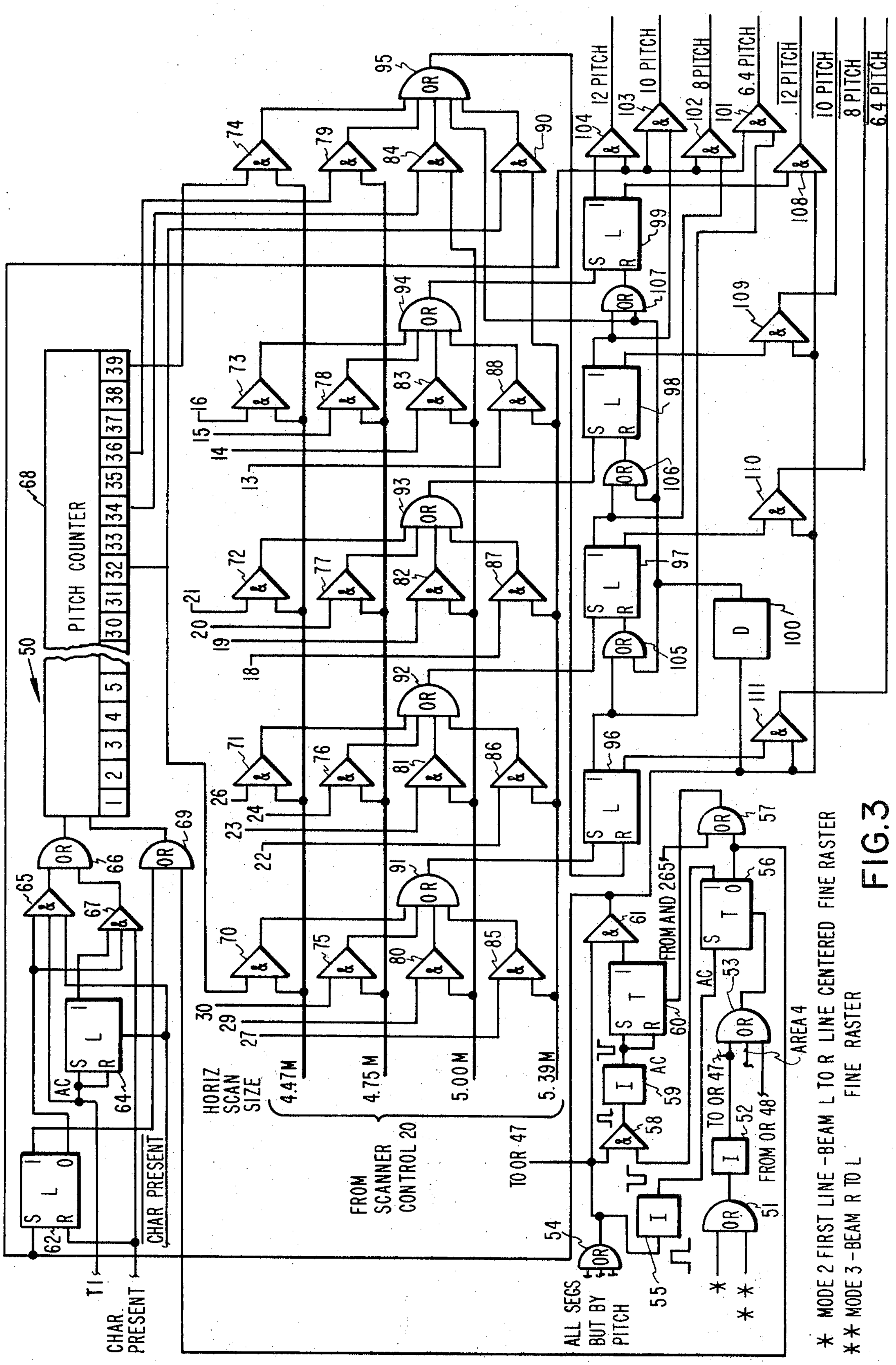
FIG. 3 is a detailed logic diagram of the Pitch Decision by Character Pairs logic circuit of FIG. 1.

Counter 68, FIG. 3, of the pitch decision circuit 50 is advanced by pulses passed by logical OR circuit 66. Logical OR circuit 66 has inputs connected to outputs of logical AND circuits 65 and 67, respectively. Logical AND circuit 65 passes impulses when the area between the pair of characters is being scanned. Logical AND circuit 67 passes impulses while the characters of the pair of characters are being scanned. Logical AND circuits 65 and 67 are conditioned by the reset output of latch 62 which is reset by the set output of latch 46, FIG. 2. Logical AND circuit 65 also has an input connected to the reset output of latch 46 while logical AND circuit 67 has an input connected to the set output of latch 46. A timing pulse T1 from control 35 is applied directly to logical AND circuit 65 and to the AC set and reset inputs of trigger 64 which has its set output connected as an input to logical AND circuit 67.

The pitch counter 68 is held reset whenever latch 62 is set or whenever trigger 56 is reset. These signals are passed via logical OR circuit 69 to the reset terminal of counter 68. Latch 62 is set after a pair of characters and the area therebetween have been scanned. Further, by holding the counter 68 reset after a pair of characters have been scanned, additional counts will not be entered into counter 68 while the space between the last character of a pair of characters and the first character of the next pair of characters is being scanned.

Logical AND circuit 61 functions to determine when a pair of characters and the space therebetween have been scanned. Logical AND circuit 61 has an input connected to the output of logical OR circuit 54 and an input connected to the set output of trigger 60. Logical OR circuit 54 has inputs connected to the outputs of the various segmentation logics of the segmentation circuitry 300. The trigger 60 has its AC set and reset inputs connected to the output of an inverter 59 which has its input connected to the output of logical AND circuit 58. Logical AND circuit 58 has one input connected to the output of logical OR circuit 54 and another input connected to the set output of trigger 56. Trigger 56 has its AC set input connected to the output of inverter 55. Inverter 55 has its input connected to the output of logical OR circuit 54. It should be noted that the triggers 56 and 60 are switched when the output pulse from logical OR circuit 54 goes away. Trigger 60 has a DC reset input terminal connected to the output of logical OR circuit 57 which has an input connected to the reset output of trigger 56 and an input connected to the output of logical AND circuit 265 for receiving a Blank Character Space signal. The DC reset input terminal of trigger 56 is connected to the output of logical OR circuit 53 which has an input connected to the output of logical OR circuit 48 within the invalid character circuit 600, an input connected to the output of logical AND circuit 268 to receive an Area 4 or Segment by Pitch signal and an input connected to the output of an inverter 52. Inverter 52 has its input connected to the output of logical OR circuit 51. Logical OR circuit 51 has an input for receiving a Mode 2 first line signal and an input for receiving a Mode 3 signal. The Mode 2 First Line signal is a control signal indicating that the beam is moving from left to right on the first line of the page with a fine vertical raster pitch. Mode 3 is the scanning mode when characters are being scanned for information content. During this mode the beam is moving from right to left with a fine vertical raster.

In this particular example, the value in the pitch counter 68 is not directly indicative of the character pitch because the horizontal scan size can be of four different values depending upon the scan height used for vertically scanning the characters. In other words, by means of the aspect ratio the horizontal scan size is dependent upon the vertical scan height. Scanner control 20 provides four different output signals each representing a different horizontal scan size for conditioning a group of five logical AND circuits. Logical AND circuits 70, 71, 72, 73 and 74 for the horizontal scan size of 4.47 mils have inputs connected to output positions 32, 26, 21, 16 and 39 respectively of pitch counter 68. The outputs of logical AND circuits 70, 71, 72, 73 and 74 are connected to inputs of logical OR circuits 91, 92, 93, 94 and 95, respectively. These logical OR circuits also have inputs connected to the outputs from the other groups of logical AND circuits for the other scan sizes, for example, from logical AND circuits 85, 86, 87, 88 and 90 respectively. The outputs of logical OR circuits 91 through 94 are connected to set inputs of latches 96 through 99 respectively. The output of logical OR circuit 95 is connected to the reset input of latch 96. It should be noted that logical OR circuit 95 also has an input connected to the output of delay 100 which has its input connected to the output of logical AND circuit 61. The output of logical OR circuit 95 indicates that the value in counter 68 became too great for a valid pitch determination.

The set outputs of latches 96, 97, 98 and 99 are connected to inputs of logical AND circuits 101, 102, 103 and 104 respectively. These logical AND circuits are conditioned by the output of logical AND circuit 61. The outputs of logical AND circuits 101, 102, 103 and 104 are indicative of 6.4 pitch, 8 pitch, 10 pitch and 12 pitch respectively. The set outputs of latches 96, 97 and 98 are also used to reset latches 97, 98 and 99 respectively. These latches are also reset by the output of delay 100. Thus for each pair of characters a specific decision is developed as to their pitch. These specific decisions are accumulated in pitch counters 112 there being a separate counter for the pitches 6.4, 8, 10 and 12.

PITCH COUNTERS

The individual pitch counters 113, 135, 136 and 137 are identical in structure and therefore only pitch counter 113 is shown. Pitch counter 113 is shown schematically in FIG. 4 as having output terminals 115 and 116 indicative that the value in the counter 113 is not at zero and less than 7 respectively. The terminals 115 and 116 are connected to inputs of logical AND circuits 117 and 118 respectively. The output of logical AND circuit 104, FIG. 3, which is indicative of a 12 pitch decision is connected to an input of logical AND circuit 118. The output of logical AND circuit 105 which is indicative of a $\overline{12}$ pitch decision is connected to an input of logical AND circuit 117. Thus, if the value in the counter 113 is less than 7, logical AND circuit 118 is conditioned and if the decision is a 12 pitch decision, a one is added into the counter. On the other hand, if the value in counter 113 is not equal to zero, logical AND circuit 117 is conditioned and if the pitch decision is $\overline{12}$ pitch, then one is subtracted from the value in the counter 113.

The details of the counter 113 are shown in FIG. 5. The counter 113 is a three position binary trigger counter. The value 0 is obtained by connecting the set outputs of triggers T1, T2 and T4 to inputs of logical OR circuit 119. Therefore, if any one of the triggers is ON, the value in the counter 113 is other than zero. The value less than 7 is obtained by connecting the reset outputs of triggers T1, T2 and T4 to inputs of logical OR circuit 120. Hence, if any one of the triggers T1, T2 and T4 is reset, the value in the counter is less than 7. The output of logical AND circuit 117 is connected to an input of logical OR circuit 121 and to inputs of logical AND circuits 122 and 123. The output of logical AND circuit 118 is connected to another input of logical OR circuit 121 and to inputs of logical AND circuits 124 and 125. The output of logical OR circuit 121 is connected to an input of logical AND circuit 126 which has its output connected to the input of inverter 127 and to inputs of logical AND circuits 122 and 124. Logical AND circuit 126 also has an input connected to receive the End Pair signal from logical AND circuit 61. The output of inverter 127 is connected to the AC set and reset inputs of trigger T1. The set and reset gated inputs of the triggers T1, T2 and T4 are connected to the reset and set outputs thereof respectively. Further, the DC reset inputs of triggers T1, T2 and T4 are connected to the output of inverter 52 for receiving the Not Segment Mode signal. The outputs of logical AND circuits 122 and 124 are connected to inputs of logical OR circuit 128 which has its output connected to inputs of logical AND circuits 123 and 125 and to the input of inverter 129. The output of inverter 129 is connected to the AC set and reset inputs of trigger T2. The outputs of logical AND circuits 123 and 125 are connected to inputs of logical OR circuit 130. The output of logical OR circuit 130 is connected to the input of inverter 131 which has its output connected to the AC set and reset inputs of trigger T4. By the connections just described, counter 113 is capable of operating in additive and subtractive modes. For example, if the input conditions to logical AND circuit 117 are met, logical AND circuit 126 is conditioned via logical OR circuit 121. Logical AND circuit 126 passes the End Pair signal to inverter 127. Thus, when the End Pair signal goes away, the state of the trigger T1 is switched. Further, the output of logical AND circuit 126 is applied to logical AND circuits 122 and 124. Logical AND circuit 124 will not be conditioned at this time because logical AND circuit 118 is not satisfied. Although logical AND circuit 122 is conditioned by the output of logical AND circuit 117, it will or will not pass a signal, depending upon whether trigger T1 is set or reset respectively. Logical AND circuits 123 and 125 receive an impulse from the output of logical OR circuit 128 if one is available therefrom. Logical AND circuit 125 is not conditioned in this instance. Logical AND circuit 123 is conditioned by logical AND circuit 117; however, trigger T2 must be in the reset state in order for logical AND circuit 123 to pass a signal from logical OR circuit 128. It should be noted that logical AND circuits 124 and 125 are conditioned by logical AND circuit 118, which controls the counter in an additive mode.

DYNAMIC PITCH DECISION LOGIC

The dynamic pitch decision logic, FIG. 8, functions to examine the contents of the pitch counters 112 at all times and provides a pitch decision at any one time. The pitch decisions, of course, are either that the characters are 6.4 pitch, 8 pitch, 10 pitch or 12 pitch. If two different pitches appear to be maximum at any one time, then the pitch representing the widest character, i.e., the lower number pitch, is taken as the pitch decision. Further, if no decision can be made with regard to pitch, such as when there is insufficient information to make a decision, a character pitch of 10 is arbitrarily chosen. Logical AND circuit 141, 142, 145 and 146 function to provide output signals indicative of 12 pitch, 10 pitch, 8 pitch and 6.4 pitch, respectively. The inputs into these logical AND circuits indicate that the associated counter has a value greater than or in some cases equal to the values in the other pitch counters. Further, each logical AND circuit has an input indicating that its associated counter is equal to or greater than 4. For example, logical AND circuit 141 has inputs indicating that counter 113 has a value greater than the values in the counters 135, 136, 137 and also has a value which is equal to or greater than 4. Logical AND circuit 142 has inputs indicating that the counter 135 has a value equal to or greater than the value of 113 and has a value greater than the value in counters 136 and 137 and has value equal to or greater than 4. In order for a logical AND circuit 145 to be satisfied, the value in counter 136 must be greater than or equal to the values in counters 113 and 135 and must be greater than the value in counter 137 and must have a value equal to or greater than 4. The character pitch decision is equal to 6.4 pitch if the value in counter 137 is greater than or equal to the value in counters 113, 135 and 136 and the value in counter 137 is equal to or greater than 4.

Logic circiutry 150 consisting of logical AND circuits 151, 152 and 153 develops output signals indicative that the values in counter 113 are equal to 4, 5 and 6 respectively. The reset output from trigger T4 of counter 113 is indicative that the value is less than or equal to 3 and it is connected to an input of logical AND circuit 143 whose output is indicative that no pitch decision could be made.

Two sets of logic are required to develop comparison information for the counter 135. One set of logic shown as block 155 is similar to the logic 150 for developing exact values from the binary bits within the counter 135 and the other set of logic 160 includes a logical AND circuit 161 having inputs connected to the set outputs of trigger T1 and T2 and an input connected tot he reset output of trigger T4. The output signal from logical AND circuit 161 is indicative that the counter 135 is equal to 3. This output is connected to an input of logical OR circuit 162 which also has an input connected to the set output of trigger T4 of counter 135. This latter input is indicative that the value in counter 135 is equal to or greater than 4. The output of logical OR circuit 162 provides a signal indicating that the value in counter 135 is equal to or greater than 3. Logical OR circuit 163 has inputs connected to the set outputs of triggers T1 and T2 of counter 135. The output of logical OR circuit 163 is connected to an input of logical AND circuit 164 which also has an input connected to the set output of trigger T4 of counter 135. The output of logical AND circuit 164 indicates that the value in counter 135 is equal to or greater than 5. Logical AND circuit 165 has inputs connected to the set outputs of triggers T2 and T4 of the counter 135 and its output is indicative that the value in counter 135 is equal to or greater than 6. The reset output of trigger T4 of counter 135 represents that the value in counter 112 is less than or equal to 3 and it is connected to an input of logical AND circuit 143. It should be noted that the reset outputs from triggers T4 of counters 113, 135, 136 and 137 are each indicative that the value in the respective counter is less than or equal to 3 and these outputs are connected to inputs of logical AND circuit 143. When the values in counters 113, 135, 136 and 137 are less than or equal to 3, a pitch decision cannot be made and the output of logical AND circuit 143 is used to indicate this fact; however, a pitch of 10 is arbitrarily chosen by connecting the output of logical AND circuit 143 to an input of logical OR circuit 144 which also has an input connected to the output of logical AND circuit 142 which passes a signal indicating that the character pitch is 10.

Although not shown in detail, two sets of logic circuitry 166 and 167 similar to the sets of logic circuitry 155 and 160, respectively, for counter 135 are provided for counter 136. In connection with counter 137, only one set of logic circuitry 168 is required and this set of logic circuitry not shown in detail is similar to the logic circuitry 160 for counter 112.

The inputs to the logical AND circuits 141, 142, 145 and 146 are developed by logic circuitry similar to circuit 170 which includes logical AND circuit 171 through 174, logical OR circuit 175 and inverter 176. Any output from logical AND circuits 171 through 174 is indicative that the value in counter 135 is equal to or greater than the value in counter 113. Conversely, if there is not an output from any of these logical AND circuits, then the value in counter 113 is greater than the value in counter 135. Thus, the outputs from logical OR circuit 175 and inverter 176 are connected to inputs of logical AND circuits 142 and 141, respectively. The logic circuits 180 through 184 are similar to the logic circuit 170. Logic circuit 180 develops two output signals, one indicating that the value in counter 113 is greater than the value in counter 136 and the other indicating that the value in counter 136 is greater than or equal to the value in counter 113. These outputs are connected to inputs of logical AND circuits 141 and 145 respectively. The two outputs from logic circuit 181 indicate that the values in counters 113 and 137 are greater than and greater than or equal to the values in counters 137 and 113 respectively and are connected to inputs of logical AND circuits 141 and 146 respectively. The outputs from logic circuit 182 are connected to inputs of logical AND circuits 142 and 145 respectively. The outputs from logic circuit 183 are connected to inputs of logical AND circuits 142 and 146 respectively and the outputs of logic circuit 184 are connected to inputs of logical AND circuits 145 and 146 respectively.

CHARACTER SPACE DIVISION AND BLANK CHARACTER SPACE DETECTION CIRCUITRY

The character space division and blank character space detection circuitry 200, FIGS. 1 and 9, has two major functions. The first function is to divide the character space into different areas and in this particular example three different areas according to the horizontal scanner pitch and the character pitch. The other function of circuitry 200 is to detect a blank character space, and provide an output signal indicative of this condition.

Scan counter 205 is a 27 position counter. Each position of counter 205 is indicative of a particular number of scans having occurred. The output positions for counter 205 are shown as 8 through 34. This is because the first seven scans within a character space are all within the first area. Hence no specific scan count signal is required during the first seven scans. However, the first seven scans are counted within buffer counter 210 which is a three position binary counter. Logical AND circuit 211 has inputs connected to the set outputs of the stages forming counter 210 and thus when all the stages are on, logical AND circuit 211 passes a signal to logical AND circuit 212. Logical AND circuit 212 also has an input connected to receive a T39 timing signal from control 35. The output of logical AND circuit 212 is connected to an input of logical OR circuit 213 which has its output connected to the advance terminal of scan counter 205. In order to prevent counter 210 from counting past 7, the output of logical AND circuit 211 is also connected to the input of inverter 214 which has its output connected to the input of logical AND circuit 215. Logical AND circuit 215 also has an input for receiving a T39 timing signal. The output of logical AND circuit 215 is connected to the advance terminal of counter 210.

Counter 210 is reset by an output from logical OR circuit 220 which also has its output connected to an input of logical OR circuit 221. The output of logical OR circuit 221 is connected to the reset terminal of scan counter 205. The output of logical OR circuit 220 is also connected to an input of logical AND circuit 222 which has another input for receiving a T35 timing signal. Thus if there is an output from logical OR circuit 220, counters 205 and 210 are reset. In addition to the input from logical AND circuit 222 logical OR circuit 220 has an input connected to the output of logical AND circuit 265 for receiving a Blank Character Space signal, an input connected to the output of a logical AND circuit 268 for receiving a Segment By Pitch signal and inputs for receiving other segmentation signals.

Auxiliary counter 225 is a three position binary counter and functions to count up to seven scans only while the Character Present signal is available. The advance terminal of counter 225 is connected to the output of a logical AND circuit 226 which has an input for receiving the Character Present signal, an input connected to receive a T34 timing signal, and an input connected to the reset output of latch 227. Thus, at every T34 time if an ON character signal is present and latch 227 is in its reset state, counter 225 is advanced. Logical AND circuit 228 has inputs connected to the set outputs of the three triggers forming counter 225. The output of logical AND circuit 228 is connected to an input of logical OR circuit 221, to an input of a logical AND circuit 229 and to the set input of latch 227. Logical AND circuit 229 also has an input for receiving a T36 timing signal. The output of logical AND circuit 229 is connected to AC set the triggers forming the counter 210. By this arrangement when counter 225 reaches a value of 7, the input conditions to logical AND circuit 228 are satisfied. The counter 205 is reset and the value of 7 is entered into counter 210 via the logical AND circuit 229. Further the latch 227 is set. The set output of latch 227 is connected to an input of a logical AND circuit 230 which also has an input for receiving a T37 timing signal. The output of logical AND circuit 230 is connected to the reset input of counter 225. Latch 227 has its reset input connected to receive a $\overline{\text{Character Present}}$ signal. Therefore with latch 227 set then at T37 time, counter 225 is reset.

Due to the fact that a hyphen and period and several other characters have a video data bit pattern which does not allow the enabling of the MINAND and PRODIF segmentation logic circuits it is necessary to forcibly enable these logic circuits. This is accomplished by entering four pulses into a scan counter 205 via logical OR circuit 213. Logic block 235 which consists of conventional logical AND and OR circuits and other logical elements such as delays, inverters, etc., has inputs connected to selected outputs of the shift register 39. The inputs lead to logic circuitry for detecting that a period or hyphen has been scanned. Position 12 of scan counter 205 is connected as an input to circuit 235 and gates four serial advance pulses to logical AND circuit 236 when the logical conditions within 235 are met. Logical AND circuit 236 also has an input for receiving a Character Present signal. After the four advance pulses are entered into counter 205, the value therein will be at 16 and this artificially creates or accelerates the desired area condition to activate the MINAND and PRODIF segmentation circuits.

The Area 1 indication is provided by means of latch 240 which has its set input connected to the output of logical OR circuit 241 and its reset input connected to receive a $\overline{\text{Character Present}}$ signal. Logical OR circuit 241 has inptus connected to the outputs of logical AND circuits 242 through 257. The inputs to these logical AND circuits include an output from a particular position of the scan counter 205, a particular scanner pitch signal and a particular character pitch signal. Therefore, when any of these logical AND circuits is satisfied, latch 240 is set. A similar arragement is used for developing the Area 2 signal. Latch 258 has its set input connected to the output of a logical OR circuit 259 which has inputs connected to the outputs of logical AND circuits 260 similar to logical AND circuits 242 through 257. These logical AND circuits 260 have the same scanner pitch and character pitch input signals as the logical AND circuits 242 through 257 but have different inputs from the positions of the scan counter 205. It should be noted that the reset input of latch 258 is connected to receive the $\overline{\text{Character Present}}$ signal.

The next two areas to be described, i.e., Area 3 and Area 4, are not truly areas but rather positions within the character space. The Area 3 signal is developed for forcibly enabling the MINAND and PRODIF segmentation logic circuits if they had not been previously enabled in Area 2. Logic circuitry 263 is a matrix of logical AND circuits similar to the logical AND circuits 242 through 257 but having different inputs from the scan counter 205. The outputs of these logical AND circuits are connected to inputs of logical OR circuit 262 which has its output connected to the set input of latch 261 and to the input of logical AND circuit 264. Logical AND circuit 264 also has an input for receiving a T36 timing signal. The output of logical AND circuit 264 is indicative of Area 3. The set output of latch 261 is connected to an input of logical AND circuit 265. Logical AND circuit 265 also has an input for receiving the $\overline{\text{Character Present}}$ signal and an input for receiving a T35 timing signal. The output of logical AND circuit 265 is indicative of a blank character space. It should be noted that if a segmentation has not occurred after the Area 3 signal is developed then a segmentation is forced two scans later. This is accomplished by connecting the output of latch 261 to an input of logical AND circuit 266 which also has an input for receiving the T39 timing signal. The output of logical AND circuit 266 is connected to advance a two position binary counter 267. When the value in counter 267 reaches 2, logical AND circuit 268 is conditioned. Logical AND circuit 268 has additional inputs connected to receive the character present signal and a T35 timing signal. The output of logical AND circuit 268 is indicative of Area 4 or a segmentation forced by pitch.

THREE BLANK SCANS SEGMENTATION

Three Blank Scans segmentation occurs when the first column of shift register 39 and both look-ahead registers LA–1 and LA–2 are empty. This is accomplished by setting lacthes 302, 305, 307 when any of the three scans have black bits in them. The inputs to these latches are modified as a function of what part of hte character being scanned is entering the shift register. The three blank segmentation is the output of logical AND circuit 301 which has as inputs timing pulse T35, Character Present signal from latch 46, the reset outputs of latches 302, 305 and 307, and the 7 Scan Count signal from logical AND 659. The latches are set by the outputs of logical ANDs 303, 306 and 308 respectively. Logical AND 303 has as one input LA1–1 and as the other input the output of logical OR 304 whose inputs are LA1–2 and not Area 2 signal from inverter 312. Logical AND 306 has as inputs LA2–1 and the output of logical OR 310 whose inputs are LA2–2 and the not Area 2 signal. Logical AND 308 has as inputs shift register position 1–1 and the output of logical OR 309 whose inputs are SR1–2 and the not Area 2 signal. It can be seen then that during the last part of a character, it takes at least two vertically adjacent black bits to cause a particular scan to be called not blank. During the early part of the character, however, any black bit in an appropriate scan will set one of the latches 302, 305 or 307 causing that scan to be called not blank. Thus, the Three Blank Scans Segmentation occurs when 302, 305 and 307 have not been set at any time during the scan. Latches 302, 305 and 307 have as reset inputs timing pulse T38.

ONE BLANK SCAN SEGMENTATION

One blank segmentation is developed as the output of logical AND 311. One input to logical AND 311 is timing pulse T35. Another input is Area 1. The third input is the reset output of latch 305.

NOT ANDED SEGMENTATION

The NOT ANDED Segmentation signal is developed through logical AND circuit 315. The inputs to logical AND circuit 315 are timing pulse T35, Area 2, and the reset output of latch 314. Latch 314 has as set input the output of logical AND 313. Logical AND 313 has as inputs LA2–1 and shift register 1–1. Latch 314 is reset by timing pulse T38. If any horizontally adjacent black bits occur between the LA2 and the first column of shift register 39, latch 314 is set. If no such condition occurs, then at the end of that scan, a NOT ANDED segmentation signal is developed.

SERPENTINE WHITE SEGMENTATION

The serpentine white segmentation circuit looks for a path of white from the top to the bottom of the raster area but not necessarily in only one scan but over a range of three scans. Instead of looking for all the logical combinations of white bits from top to bottm of the shift register over the range of three scans, the implementation looks for any combinations of black bits from left to right over the range of thre scans which would result in a discontinuous white path from top to bottom.

Logical AND 324 whose output is Serpentine White Segmentation has inputs of Area 2, timing pulse T35, and the reset output of latch 323. Latch 323 is set by the output of logical OR 322 whose inputs are the outputs of logical ANDS 319, 320, 321. A common input to logical AND 319, 320 and 321 is LA2–3. Other inputs are shift register position 1–2 and output of logical OR 319, shift register positions 2–3 and output of logical OR 317, shift register position 3–4 and output of logical OR 318 rsepectively. The inputs to logical OR 316 are shift register positions 2–1, 2–2 and 2–3. The inputs to logical OR 321 are shift register positions 2–2, 2–3 and 2–4. The inputs to logical OR 318 are shift register positions 2–3, 2–4 and 2–5. A test is continually made through the scan for any combination of black bits either horizontal or diagonally adjacent over the range of 3 scans, the leftmost of which is in look-ahead LA–2. If any such combination occurs, latch 323 is set and there will be no serpentine white segmentation. If no such combination occurs, then there must be a continual path of white from the top to the bottom of the raster area between the character to be segmented and the adjacent character. A serpentine white segmentation will then take place.

MINAND

The Minand circuitry counts and compares the frequency of the occurrence of pairs of horizontally adjacent black bits in scans under consideration. The adjacencies are looked for between bits in look-ahead register LA–1 and the bits of data in look-ahead register LA–2 and also between the bits in look-ahead LA–2 and the data in the first column of shift register 39. Logical AND 332 has as inputs SR1–1 and LA2–1. The output of logical AND 332 is one input to logical AND 328 and also of logical AND 329. The other input to logical AND 329 is the set side of latch 326 while the second input of logical AND 328 is the reset side of latch 326. Logical AND 334 has as inputs look-ahead LA2–1 and LA1–1. Logical AND 334 forms one input to logical AND 330 and one input to logical AND 327. The other input to logical AND 327 is the set side of latch 326 while the other input to logical AND 330 is the reset side of latch 326. Logical OR 335 has as inputs the outputs of logical AND 327 and logical AND 328. Logical OR 337 has as inputs the outputs of logical AND 329 and of logical AND 330. Thus, latch 326 causes the outputs of logical ANDs 332 and 334 to be reversed whenever set or reset. Logical OR 335 sets latch 336 and logical OR 337 sets latch 338. The setting of latch 336 and the occurrence of shift register control pulse Reset 1 or the setting of latch 338 and the occurrence of shift register control pulse Reset 1 causes counter 346 to be advanced in a positive or negative direction respectively. The shift register 39 and control pulses can be of the type shown and described in the IBM Technical Disclosure Bulletin, vol. 7, No. 7, page 600, dated December, 1964. Care must be taken to prevent an ambiguous situation when latch 336 and 338 are both set. This is done by having one input of logical AND 339 connected to the set output of latch 336 and the other input of logical AND 339 connected to the set output of latch 338. The output of logical AND 339 is connected to the input of inverter 341 whose output is connected to an input of logical AND 342. The advance to the counter 346 is inhibited under the described conditions. The output of logical AND 342 advances the first stage of the forward-backward counter 346. The set output of latch 336 forms the plus count input to forward-backward counter 346. Similarly, the set output of latch 338 forms the subtract input to forward-backward counter 346. The reset to latch 336 and to latch 339 is Advance 1. Thus, we have forward-backward counter 346 counting the difference in the number of occurrences of the outputs of logical ANDs 332 and 334. The status of latch 326 determines whether a particular output from logical AND 332 or 334 will be a plus count or a minus count into forward-backward counter 346. Counter 346 has five binary stages and a sign stage. Logical OR 347 is connected to stage 2, 4, 8 and 16 of binary forward-backward counter 346. Its output which has one input to logical AND 348 is present whenever a count of 2 or greater is present in forward-backward binary counter 346. One other input of logical AND 348 is the plus indication from the sign stage of counter 346. Another input to logical AND 348 is the output of inverter 349 whose input is the set output of latch 350. Latch 350 is set by the output of logical AND 351 whose inputs are connected to stages 4 and 8 of binary counter 352. Binary counter 352 is advanced by the output of logical AND 339 and is reset by T38. Counter 352 counts the simultaneous occurrence of latches 336 and 338 which is equivalent to the simultaneous occurrence of logical ANDs 332 and 334. Thus the logical condition which satisfies logical AND 348 is a positive count in counter 346 of at least magnitude 2 and a value in counter 352 of less than 12. Counter 352 thus modifies the output of counter 346 whenever the condition of any simultaneous horizontally adjacent black bits occurs over the range of three scans, LA1, LA2, and shift register 1. This condition occurs during the left-hand edge of certain upper case characters, for example, that the case B, D, E, etc. Logical AND 348 along with T37 form the inputs to logical AND 325. The output of logical AND 325 is the set input to latch 326. Latch 350 is reset by T38. Latch 326 has as its reset input the Area 2 signal from inverter 312. Logical AND 331 has as one input the set output of latch 326, as another input the timing pulse T35 and as the final input the output of logical AND 348.

By connecting the output of logical AND 348 to the input of AND 325, the outputs of latch 326 then reverses the direction of counting of the outputs of logical AND 332 and 334. A count of +2 in counter 346 means that there are more horizontally adjacent black bits or ANDed pairs on the right of LA2 than on the left. Once logical AND 348 is satisfied, then the next time it is satisfied, it indicates that the frequency of occurrence of ANDed bits to the left of LA2 is at least 2 greater than to the right. By having the output of latch 326 connected to logical AND 331 then the second occurrence of logical AND 348 causes Minand Segmentation.

PRODIF SEGMENTATION

The purpose of the Prodif segmentation circuit is to furnish a segmentation signal for separating touching or nearly touching characters. This segmentation circuit first determines that the left side of a character has been reached, and next determines that the right side of the next character has entered the look-ahead register. When it has been determined that the right side of the next character has entered the look-ahead register, a Prodif segmentation will occur. Determination that both of the above events have occurred is accomplished by a ratio test of certain of the black bits in the look-ahead register LA–1 to certain of the black bits in column 1 of shift register 39. The criteria that the left edge of a character has been reached is:

(1). The ratio of black bits counted during one scan in look-ahead register LA1 to the black bits counted in shift register column 1, during Area 2, is less than or equal to one-half.

(2). If, during Area 2, the count of bits in look-ahead register LA-1 during one scan is zero, the count of shift register 39, column one must be at least two.

(3). If black bits are present in the look-ahead register LA-1 or shift register 39, column 1, in the positions which correspond to the top or bottom three rows of the character in the register 39, they are not counted.

(4) If the above criteria are not satisfied, an Area 3 signal will indicate that the left side of the character is present.

The criteria for the determination that the right side of the next character is in the look-ahead register is:

(1) The ratio of the black bits counted during one scan in look-ahead register LA-1 to the number of black bits counted in shift register 39, column 1, is at least two to one.

(2) If no bits are counted during one scan in shift register 39, column 1, the count from look-ahead register LA-1 must be at least two.

(3) If black bits are present in look-ahead register LA-1 or shift register 39, column 1, in positions which correspond to the top or bottom three rows of the character in the shift register 39, they are not counted.

This determination must be made during Area 2 and must follow the determination that the left edge of the character has been reached.

When the criteria indicating the left edge of a character has been reached is met, then the Prodif segmentation circuit is enabled. If, following the enabling of the Prodif circuit, the criteria for determination that the right side of the next character is in the look-ahead register is met segmentation will occur. The determination of the top and bottom three rows of the character, the suppression of counting in these areas, and the testing of the various other criteria mentioned above is accomplished using circuits schematically shown in FIG. 13. Logical OR circuit 360 will have inputs connected to shift register positions column 1-3 through column 13-3. OR circuit 360 will have an output whenever a black bit is present in any of these shift register positions. The output of OR 360 is an input to logical AND circuit 361. The second input to logical AND circuit 361 is a timing pulse Reset 2. As a character is being shifted in the shift register 39, if black bits within the character correspond to the register positions on the input of logical OR 360, then at Reset 2 time there will be an output from logical AND circuit 361. The output of logical AND circuit 361 is an input to logical AND circuit 362. The second input to logical AND circuit 362 is the output of inverter 363. Input to said inverter is the output of logical AND circuit 364. The inputs to logical AND circuit 436 are the 1, 2 and 4 outputs of Prodif Control Counter 365. If the Prodif Control Counter has a count less than seven, then the output of logical AND 364 will be off and the output of inverter 363 will be on. If logical AND circuit 361 has an output at this time, then logical AND circuit 362 will have an output and advance the Prodif Control Counter. If a count of 7 is reached in the Prodif Control Counter 365, no further pulses will be allowed to advance the counter until the counter has been reset. The output of logical OR circuit 366 is connected to the reset input of the Prodif Control Counter 365. One input of logical OR circuit 366 is timing signal T37. Another input is the output of logical AND circuit 367. One input to logical AND circuit 367 is the output of logical AND circuit 368. The inputs to logical AND circuit 368 are Reset 2 timing signal and the output of inverter 403. The input to inverter 429 is the output of logical OR circuit 402. Thus, if logical OR circuit 360 does not have any black bits at its inputs during the Reset 2 timing pulse, the associated input to logical AND 367 will have a pulse. A signal at the other input to logical AND 367 from inverter 363 indicates that the Prodif Control Counter 365 has a count less than 7. Therefore, if the Prodif Control Counter 365 has a count less than 7 and all white bits appear on the input to logical OR circuit 360, the Prodif Control Counter 365 will be reset.

The output of counter 365 is decoded by logical AND 402, logical OR 405 and inverter 369 so that inverter 369 will have an output if counter 365 has a count less than 3. The output of inverter 369 is used to reset trigger 370, counter 371 and latches 394 and 395 via logical OR 404. Thus, if counter 365 is reset or contains a count less than 3, inverter 369 will have an output and trigger 370, counter 371 and latches 394 and 395 will be reset. The purpose of this reset is to eliminate video noise patterns from being considered as the bottom of the character.

Logical OR circuit 372 has inputs connected to shift register 39 positions column 1-39 to column 12-39 respectively. Since the number of bits in any one column of the shift register is 39, these positions are effectively three positions away from the inputs to logical OR 360. Bits which appear in the 39th row will appear three shift times later in the 3rd row of the shift register. As black bit shifts by the inputs to logical OR 372, an output is generated. This output is an input to logical AND 373. Another input to AND circuit 373 is the output of logical AND 361. Since logical AND 361 will have an output only when black bits are present at the input to logical OR 360 and Reset 2 timing pulse is present, then logical AND 373 will have an output only when black bits are present at the input to logical OR block 360 and logical OR 372. This means that once the top of the pattern has shifted past the inputs to logical OR 360, there will be no further output from logical AND 373. Thus, the output will stop three shift positions before the top of the character has shifted past the input to logical OR 372. The Prodif Counter 371 is held reset for the first three counts of the Prodif Control Counter 365 and the output of AND circuit 373 is used as basic timing for the counts, therefore, during the 3 rows at the top and bottom of character, no count is entered in the Prodif Counter 371. It is desirable to suppress the count in this area since the presence of serifo in these areas would have an adverse effect on the ratio criterias used.

The Prodif Counter is a forward-backward type counter and is used in the following manner in order to initialize Prodif segmentation. Latch 374 will be used when a count is to be subtracted from the Prodif Counter 371. Latch 374 is reset by timing signal Adv. 1. Latch 374 is set by the output of logical OR circuit 375. One input to logical OR 375 is the output of logical AND 376. Inputs to logical AND 376 are look-ahead register LA-3, the Area 2 timing signal and the output signal from logical AND 373. Another input is the output of inverter 377. Input to inverter 377 is the output of the Prodif Initialize Latch 378. Therefore, latch 374 will be set if Prodif is not initialized, there is a black bit in look-ahead register LA1-3 and the bit in look-ahead register LA1-3 is at least 3 shift positions below the top of the character.

PRODIF SEGMENTATION

Latch 379 is the Prodif Count Plus Latch. The reset input to latch 455 is an advance 1 timing signal. The set input of latch 379 is the output of logical OR 380. One input to logical OR 380 is the output of logical AND 381. Logical AND 381 has inputs from inverter 382. The input to inverter 382 is the output of latch 378. Latch 378 is set when prodif is initialized, therefore input to AND circuit 381 from inverter 382 will only be on when Prodif has not been initialized. A second input to logical AND 381 is Area 2 timing signal. A third input to logical AND 381 is shift register position shift register 1-3. The fourth input to logical AND 381 is the output of AND circuit 373. With the inputs described, AND circuit 381 will only have an output when Prodif has not been initialized, there is a bit in shift register position shift register 1–3, Area 2 is present and the bit in shift register position shift register 3–1 is at least 3 shift positions down from the top of the character. Under these conditions, latch 379 will be set. In order to determine that the ratio of the black bits counted in look-ahead register LA1 to the black bits counted in shift register shift register 1 is less than or equal to one-half, the black bits within shift register shift register 1 will be effectively divided by two binary trigger 370 before they enter the Prodif Counter 371. If at the end of the scan, the count in counter 371 is positive, it is indicative that this ratio was less than or equal to one-half or no count has entered the counter. The add gate to counter 371 is the output of logical AND 383. The inputs to AND circuit 383 are the on output of trigger 370, Reset one, timing signal, the output of the latch 370, and the output of inverter 384. The input to inverter 384 is the output of logical AND 385. One input to AND circuit 385 is the output of latch 379. A second input to AND circuit 385 is the output of latch 374. If latch 379 and 374 are on, then there will be an output from logical AND 385 resulting in AND circuit 383 being off. Thus, no count will be added to the counter. If, however, the count minus latch is not on and the count plus latch is on, there will be an output from inverter 384. If trigger 370 is also on, then when Reset one timing signal occurs there will be an output from logical AND 383 conditioning the add line of counter 371. Trigger 370 has a binary input the output of inverter 386. Input to inverter 386 is the output of logical AND 387. The input to AND circuit 387 is the on output of latch 379. A second input to logical AND 387 is timing signal Reset 1. If latch 379 is set, the arrangement of AND circuit 387 and inverter 386 is such that when Reset 1 timing signal appears the trailing edge of this timing signal will change the state of trigger 370. When the reset of trigger 370 is not present, it will be turned alternately on and off when the latch 379 is turned on. This effectively divides the number of count plus occurrences by two. The subtract input gate to counter 371 is the output of logical AND 388. One input to AND circuit 388 is the output of latch 374. A second input to AND circuit 388 is the output of logical OR circuit 389. One input to logical OR circuit 389 is the off output of trigger 370. A second input to logical OR 389 is the output of inverter 384. Therefore, if latch 374 is set, a subtract gate will be provided to counter 371 at the time of the Reset 1 timing signal if latch 379 is not on or if trigger 370 is not on.

This logical arrangement will assure that the subtract gate input will be conditioned only when the add gate is not conditioned. This arrangement also assures that when a condition to add to the prodif counter exists at the same time, a condition to subtract from the prodif counter then neither gate will be up, therefore there will be no change in count of counter 371. The input driving the counter 371 is the output of inverter 390. The input to inverter 390 is the output of logical OR 391. The inputs to logical OR 391 are the output of logical ANDs 383 and 388. These inputs are the add and the subtract gate of counter 371 respectively. The arrangement of OR circuit 391 and inverter 390 is such that when the add gate or the subtract gate are turned off, counter 371 will add or subtract a count, depending upon which gate was on. There are 8 possible combinations of the outputs of latches 379 and 374 and trigger 370. The resultant effect on the count in counter 371 is as follows: if latches 379 and 374 are on, trigger 370 is on, then there will be no change in the count in counter 371. If latch 379 and 374 are on and trigger 370 is off, there will be a reduction in count by 1 in counter 370. If latch 379 is on, latch 374 is off and trigger 370 is on, there will be an addition of one count to counter 370. If latch 379 is on, latch 374 is off and trigger 370 is off, there will be no change in the counter 370. If latch 379 is off, latch 374 is off and trigger 370 is on, there will be no change in the counter 371. If latch 379 is off, latch 374 is on, trigger 370 is off, there will be a reduction of one in counter 371. If latch 379 is off, latch 374 is on and trigger 370 is on there will be a reduction of one in counter 371. If latch 379 is off, latch 374 is off and trigger 370 is off, there will be no change in the counter 371.

Logical OR 392 has inputs from the 1, 2, 4, 8 and 16 trigger on outputs of counter 371. Output of logical OR 392 is an input to logical AND 393. Another input to logical AND 393 is the plus output of the counter 371. A third input to logical AND 393 is timing signal T35. If logical AND 393 has an output, then this is indicative that there have been at least two plus outputs from latch 379. The output of logical AND 393 is attached to the set input of latch 394. If this latch is set before Prodif is initialized, it indicates that the ratio of the black bits counted in look-ahead register LA1 to the black bits counted in shift register shift register 1 is less than or equal to one-half. It is possible, however, to have a count of zero in the prodif counter with a plus sign and have the ratio of one-half exist. Since the prodif counter is reset to plus zero, a decoding of the plus zero state is inadequate to determine if a valid criteria has been met for initialization of the Prodif Segmentation Circuits. A validity test which would assure that the plus zero state of the prodif counter was indeed a valid state is to set latch 395 with the output of the count minus latch 374. If latch 374 has been set during the scan, this assures that at least two count plus conditions have occurred in order for the sign of counter 371 to be positive at this time. Logical AND **395*a* has as an input the output of latch 395. Another input to logical AND 395*a* is the prodif plus output of counter 371. Output from AND circuit 395*a* is an input to logical OR circuit 396. Another input to logical OR circuit 396 is the on output of latch 394. If either of these inputs to logical OR circuit 396 is present, then criteria necessary to enable the Prodif Segmentation Circuits has been met. The output of logical OR 396 is an input to logical AND 397. Another input to AND circuit 397 is timing signal T37. Yet another input to AND circuit is the output of AND circuit 364. The output from AND circuit 364 indicates that the character was at least 7 bits high. The output of AND circuit 397 is an input to logical OR circuit 398. Output of logical OR 398 is an input to the Prodif Initialization Latch 378. Either input to logical OR 398 will cause latch 378 to turn on initializing the Prodif Segmentation Circuits. The output of latch 378 is used as an input to logical AND circuits 399 and 400. When the prodif initialization signal is present, then AND circuits 376 and 381 will be conditioned off. With this change in the gating of logical AND circuits 400, 399, 388 and 376, the bits to be counted in look-ahead register position LA1–3 will now condition the prodif count plus latch 379, and the bits to be counted in shift register position shift register 1–3 will now condition the count minus latch 374. Thus reversing the roll of these two shift registers positions. This will now enable the use of the Prodif Counter 371 and the associated circuits to determine if the criteria for Prodif segmentation is met. Counter 371 and the associated circuitry to control the add and subtract input will operate as before. Latch 394 will now be set if the ratio of black bits counted in look-ahead LA1 to the number of black bits counted in shift register shift register 1 is at least two to one. If the counter 371 contains a plus zero count, it is still necessary to check for the validity of the sign. This is done in the same manner as before. Therefore, when an output of logical OR 396 exists at the input of logical AND 401, timing signal T35 is present, the output of logical AND circuit 364 is present, and Prodif Initialization Latch 378** has been set, then a Prodif segmentation signal will occur.

CHOP SEGMENTATION CIRCUIT

The Chop segmentation circuit (character outline profile) functions to provide a segmentation signal particularly in those instances where adjacent characters are touching and at least one of the characters has a side curving toward the other, such as in the case of touching o's. The Chop segmentation circuit consists of three binary counter-buffers, 478, 507 and 508, each with inputs from the shift register or look-ahead register, two binary adders, 509 and 510, and the means of comparing the results of the adders.

Binary counter 477 is advanced by the output of logical AND 476. One input of logical AND 476 is the set output of latch 475. Latch 475 is set by a black bit in Look-Ahead position LA1–3. The other input of logical AND 476 is timing pulse TPO which is the output of logical AND 503. Logical AND 503 has one input connected to the set output of latch 502. Latch 502 is set by timing pulse T3 and is reset by timing pulse T35. The other input of logical AND 503 is shift register control pulse Advance 1. The outputs of the stages of binary counter 477 go to logical ANDS 483, 482, 481, 480 and 479. The other leg of 479 through 483 respectively go to the output of delay 484. The input of delay 484 is connected to logical AND 487. Logical AND 487 has as its inputs LA1–3 black, LA1–4 black, LA1–1 white and LA1–2 white and timing pulse TP1. Timing pulse TP1 is the output of logical AND 504. Logical AND 504 has as one input the set output of latch 502 and as one of the other inputs Reset 2 and as the final input Advance 1 inverted. Output of logical AND 487 also is an input to logical OR 485. The output of logical OR 485 goes to the reset input of latches 486, 487, 488, 489 and 490. The other input to logical OR 485 is timing pulse T38 which also goes to the reset input of latch 475 and to the DC reset of counter 477. This configuration allows counter 477 to be advanced with each shift register advance once a black bit has been seen in look-ahead position 1–3. Whenever logical AND 487 is satisfied, the outputs of the binary counter 478 are transferred to latches 486 through 490 where the instantaneous count is stored for future processing. It should be noted that the use of the delay 484 causes latches 486 through 490 to be reset prior to being set up by the current count in counter 477. The output of latches 486, 487, 488, 489 and 490 form one input to logical ANDs 491, 492, 493, 494 and 495, respectively. The other leg to logical ANDs 491 through 495 is timing pulse TP3 which is the set output of latch 506. The set input to latch 506 is the output of logical AND 505. One input to logical AND 505 is timing pulse T34. The other input is Reset 2. The outputs of logical ANDs 491 through 495 go to inverters 497 through 501, respectively. The outputs of logical ANDs 491 through 495 also go to binary adder 510. The outputs of inverters 497 through 501 also go to binary adder 510. The outputs of logical ANDs 491 through 495 are called A16, A8, A4, A2 and A1, respectively. The outputs of inverters 497 through 501 are called $\overline{A16}$, $\overline{A8}$, $\overline{A4}$, $\overline{A2}$ and $\overline{A1}$, respectively. Counter-buffer 507 is identical to counter buffer 478 except the logical AND which would be equivalent to logical AND 476 has as one of its inputs the set output of latch 511. In counter 507, the circuit which is equivalent to delay 484 and the circuit which is equivalent to logical OR 485 have their inputs from logical AND 512. The set input of latch 511 is the LA2–3 having a black bit. The reset input to latch 511 is timing pulse T38. Logical AND 512 has as its inputs black in LA2–3, black in LA2–4, white in LA2–1, white in LA2–2, and timing pulse TP1. Counter 508 is similar to counter 507 except latch 513 which is equivalent to latch 511 has as its set input black in shift register position 1–3. Logical AND 514 is equivalent to logical AND 512 except that it has as its inputs black in SR1–3, black in SR1–4, white in SR1–1, white in SR1–2, and timing pulse TP1. The outputs of counter-buffer 507 are the signals B16, B8, B4, B2, B1, $\overline{B16}$, $\overline{B8}$, $\overline{B4}$, $\overline{B2}$, and $\overline{B1}$. The outputs of counter-buffer 508 are called C16, C8, C4, C2, C1, $\overline{C16}$, $\overline{C8}$, $\overline{C4}$, $\overline{C2}$ and $\overline{C1}$. These outputs correspond to A16 through A1 and $\overline{A16}$ through $\overline{A1}$, the outputs of counter-buffer 478.

The outputs of counter-buffers 478 and 508 form inputs to binary adder 510. The outputs of counter-buffer 507 and 508 form inputs to binary adder 509. The adders 509 and 510 are functionally subtractors and each is a type of adder shown in FIG. 16–1 page 521 and modified according to the algorithms described on page 526 of the textbook entitled Digital Computer and Control Engineering by Robert S. Ledley, copyrighted in 1960 by the McGraw-Hill Book Company. The outputs of binary adder 510 are called AC16, AC8, AC4, AC2, AC1 and ACC16. Where the numbers prefixed by AC indicate the binary place values of the difference between counter-buffer 478 and 508 and ACC16 present indicates that 508 was greater than 478. The outputs of binary adder 509 are titled BC16, BC8, BC4, BC2, BC1 and BCC16, where the numbers preceded by BC are the value of the difference between counter-buffer 507 and 508 and BCC16 present means that 508 was larger than 507.

The final Chops output is from logical AND circuit 525 which has as one of its inputs timing pulse T35. One other input is the set output of latch 535. The set input to latch 535 is the output of logical AND 534 which has as its inputs timing pulse T36 and Area 1. The other input to logical AND 534 is the output of logical OR 533. Logical OR 533 has as one input C16 which is an output of counter-buffer 508 and as the other input the output of logical AND 532. Logical AND 532 has as its inputs C8 and C4, both outputs of counter-buffer 508. When latch 535 is set, it means that to the left of its centerline the character is at least twelve shift register positions tall. Another input to logical AND 525 is the output of logical OR 524 which has as one input the output of logical AND 521 and as the other input the output of delay 526. Logical AND 521 has as one input the output of inverter 515 which has as its input the ACC16 signal. Another input to logical AND 521 is the output of logical OR 519. Logical OR 519 has as one input the output of logical OR 516 and as the other input the output of logical OR 529. Logical OR 516 has as inputs the signals AC16, AC8 and the output of logical AND 517. Logical AND 517 has its inputs AC4 and the output of logical OR 518 which has its inputs AC2 and AC1. A signal present at the output of logical OR 516 means that there has been a difference in the height of the character of at least five between the portion of the character LA1 and the portion in SR1. The logic developed by the circuits 529, 530 and 531 is identical to that developed by 516, 517 and 518 except that if a signal is present at the output of logical OR 529 means there has been a difference of at least five in the character height between that portion of the character in LA2 and that portion in SR1. If signal BCC16 is present, it means that the character height in LA2 is less than the character height in SR1. A third input to logical AND 521 is the output of inverter 520 which has as its input the signal BCC16. Thus, if a signal is developed at the output of logical AND 521, it means that the height of the character in LA1 is five greater than the height of the character in SR1 and that the height of the character in LA2 is not less than the height of the character SR1. An input, to both logical AND 521 and logical AND 522, is the output of inverter 536 whose input is C8, an output of counter-buffer 508. The output of 536 indicates the height of the character in SR–1 is less than 8. This output of logical AND 521 is one of the conditions which results in a Chop Segmentation. If the condition is present that the portion of the character in LA1 is at least five shift register positions taller than the portion in SR1 but that the portion of the character in LA2 is shorter than the portion in SR1, then logical AND 522 is satisfied. Timing pulse T35 is also an input to logical AND 522. The output of logical AND 522 sets latch 523, the delayed set output of which is an input to logical OR 524. This results in the condition that if logical AND 522 is satisfied, there is a delay of one scan prior to the development of a Chop Segmentation. This is the other condition for developing a Chop Segmentation. The reset to latch 523 is the output of logical OR 527. The inputs to logical OR 527 are $\overline{\text{Area 1}}$ and the reset output of latch 535.

In general, the circuitry begins developing a segmentation somewhere in the latter half of the character by sensing that the character is first, at least twelve shift register positions tall, and second, that LA1 contains a portion of character at least five shift register positions taller than that portion in SR1.

INVALID VIDEO

There are two prime classes of video signals which should not be considered by the recognition circuits for character decisions. One class of these video signals is the background noise present due to smudges on the paper, imperfections within the paper, etc. A second class of video signals which should not be considered as those obtained from the left side of a character which is segmented early (this video is generally from horizontal serif areas of the characters).

Two circuits are used to detect invalid video. Circuit 651, FIG. 15, is used to detect background video. Circuit 660 is used to detect video signals from the prior character which are left after segmentation. Circuit 651 develops a bit count of the video bits present after a Character Present signal has been generated. If a count of less than 15 bits is obtained at the time a Three Blank Scans are detected, an invalid video signal is generated to reset shift register 39.

Circuit 651 utilizes Bit Counter 652 for counting bits from position 1 of shift register 39. The on outputs of the 1, 2, 4 and 8 triggers in counter 652 are the input signals to AND circuits 653. Thus, when a count of 15 is reached in counter 652, logical AND 653 will have an output. The output of AND circuit 653 is an input to inverter 654. Thus, inverter 654 will have an output if the count in counter 652 is less than 15. The output of inverter 654 is an input to logical AND 655. Other inputs to AND circuit 655 are the Character Present signal and position 1 of Shift Register 39. Thus an output will be obtained for each bit shifted into Shift Register 39 from AND circuit 655 when the value of counter 652 is less than 15 and the Character Present signal is present.

The output of inverter 654 is also an input to logical AND 656. A second input to logical AND 656 is the output of logical AND 669. Inputs $\overline{\text{L302}}$, $\overline{\text{L305}}$ and $\overline{\text{L307}}$ will be present if 3 blank scans have been detected. Thus, if 3 blank scans have been detected and there is a count of less than 15 in counter 652 during timing signal T35, an Invalid Video signal will be generated at the output of OR circuit 48 via AND circuit 656. It should be noted that logical combinations of segmentation criteria other than 3 Blank Scans could be used as input to AND circuit 656. Counter 652 is reset by a Character Present signal via delay circuit 657.

Circuit 660 includes logical OR circuit 661 having inputs for receiving Prodif and Minand segmentation signals and an Area 4 or segment by pitch signal. The output of logical OR circuit 661 is connected to the set input of latch 662. Thus, latch 662 is set by types of segmentations which can be considered unnatural, i.e., those where there is not a white space between adjacent characters. If either NOT ANDED or Serpentine White occur as detected by logical OR circuit 663 within 7 scans after latch 662 has been set, then the input conditions to logical AND circuit 664 are satisfied and an invalid video signal is passed thereby to logical OR circuit 48.

The 7 scan count is developed within counter 665. The advance input of counter 665 is connected to the output of logical AND circuit 666 which has an input for receiving a timing signal T1 and an input connected to the output of inverter 667. Inverter 667 has its input connected to the output of logical AND circuit 668 which has inputs from each of the set outputs of the three binary stages forming counter 665. Thus, when logical AND circuit 668 is satisfied, counter 665 has a value of 7 in it. This indication as previously described is used to prevent or inhibit the development of a Three Blank Scan Segmentation signal within 7 scans of a previous segmentation signal. Of course, when the logical AND circuit 668 is not satisfied, inverter 667 will have an output for conditioning logical AND circuit 664. It should be noted that logical AND circuit 664 also has an input for receiving a T35 timing signal. Also, it should be noted that latch 662 is reset by the output of logical AND circuit 668.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a character reading machine:
storage means for storing data bits derived in response to scanning characters;
scan count means for generating scan count signals as characters are scanned; and
pitch measuring means connected to said storage means and said scan count means for measuring character pitch by pairs of characters scanned and providing output signals indicative of character pitches.

2. In a character recognition machine:
data storage means for storing data bits as characters are successively scanned;
scan count means for generating scan count signals as characters are scanned;
means connected to said data storage means and responsive to predetermined data bits patterns therein for generating character present and character absent signals;
character pitch determining means responsive to said character present signal and to scan count signals from said scan count means for generating character pitch signals;
character area determining means responsive to said character pitch signals and to predetermined data bit patterns in said data storage means for generating signals corresponding to predetermined areas within character spaces;
logic test means connected to be conditioned by signals generated by said character area determining means and connected to said storage means to develop end-of-character signals in response to particular data bit patterns in said data storage means; and
means responsive to said end-of-character signals for further controlling said pitch determining means.

3. The character reading machine of claim 2 wherein said logic test means provides an end of character signal whenever there is a data bit pattern in said storage means having three successive blank scans anywhere within a character space.

4. The character reading machine of claim 2 wherein said logic test means provides an end of character signal whenever a data bit pattern in said storage means has a single blank scan occurring within a predetermined area of a character space.

5. The character reading machine of claim 2 wherein said logic test means provides an end of character signal whenever there is a data bit pattern in said storage means having two adjacent scans with data bits within one scan adjacent only to the absence of data bits within the other scan and with data bits in said other scan adjacent to only the absence of data bits within said one scan.

6. The character reading machine of claim 2 wherein said logic test means develops a forced end of character signal according to pitch measurement signals developed by said pitch measuring means.

7. The character reading machine of claim 2 wherein said logic test means provides an end of character signal whenever a data bit pattern in said storage means includes a continuous path of absence of data bits over a span of three scans with data bits being in any one scan of said three scans.

8. The character reading machine of claim 2 wherein said logic test means provides an end of character signal whenever a data bit pattern in said storage means results in a predetermined minimum difference between two values developed by counting the number of adjacent bits in adjacent first and second scans in one predetermied section of said storage means and counting the number of adjacent bits in said second scan and an adjacent third scan.

9. The character reading machine of claim 2 wherein said logic test means provides an end of character signal whenever a data bit pattern in said storage means has twice as many data bits in one scan than a scan located two positions away therefrom.

10. The character reading machine of claim 2 wherein said logic test means provides an end of character signal whenever a data bit pattern in said storage means has a data bit height count in a third scan when compared to data bit height counts in first and second scans, said bit height count in said third scan being below a predetermined number.

11. In a character reading machine:

data storage means for storing data bits as characters are successively scanned;

means connected to said data storage means and responsive to predetermined data bit patterns therein for generating character present and absent signals and an end character pair signal;

a scan counter; and scan counter advance control means connected to receive said character present and absent signals and said end pair signal and connected to said scan counter and operative to start to advance the same at half rate in response to a first character present signal and then at full rate in response to a character absent signal and then at half rate in response to a second character present signal and terminating advancement of said scan counter upon receiving an end character pair signal whereby the value in said scan counter upon termination of advancement is indicative of character pitch.

12. In a character reading machine including a scanner for generating data bits in response to successively scanning characters by a plurality of scans, the improvement comprising:

means for generating end-of-character signals by analyzing said data bits and determining that a character has been completely scanned;

a shaft register for storing data bits in response to characters being scanned and connected to said end-of character generating means to be reset thereby;

signal generating means connected to said shift register and responsive to data bit patterns therein to generate character present and absent signals;

scan count means for counting scans made relative to character spaces and connected to said end-of-character generating means to be reset thereby; and means connected to said scan count means and said signal generating means for generating blank character space signals when a character absent signal exists simultaneously with a predetermined scan count.

13. In a character reading machine:

a data storage register having first and second look ahead sections preceding a main section for storing data bit patterns as characters are successively scanned;

area signal generating means for generating area signals corresponding to spatial positions within character spaces; and logic test means connected to said area signal generating means to be conditioned by signals therefrom and connected to said data storage registers to develop end of character signals after having been conditioned by area signals in response to predetermined data bit patterns existing in said first and second look ahead sections.

14. The character reading machine of claim 13 wherein said logic test means develops end of character signals after having been conditioned by said area signals in response to predetermined bit patterns in said first and second look ahead sections and a first portion of said main section.

15. In a character reading machine including a scanner for generating video data bits in response to successively scanning characters by a plurality of scans, the improvement comprising:

counting means for counting video data bits;

detecting means for detecting a predetermined number of successive absences of data bits;

means for registering the number of video data bits counted at the time said detecting means detects said predetermined number of absent data bits;

means for determining if said number of video data bits is less than a predetermined number; and means for generating an invalid video signal if said number of bits is less than said predetermined number.

16. In a character reading machine including a scanner for generating data bits in response to successively scanning characters by a plurality of scans, the improvement comprising:

means for generating end-of-character signals by analyzing said video data bits and determining that a character has been completely scanned;

means for counting successive scans after the occurrence of a first end-of-character signal; and means for generating an invalid video signal if a second end-of-character signal occurs within a predetermined number of scans after the occurrence of said first end-of-character signal.

17. In a character reading machine:

data storage means for storing data bits as characters are successively scanned;

means connected to said data storage means and responsive to predetermined data bit patterns therein for generating character present and absent signals and an end character pair signal;

a scan counter;

scan counter control means connected to receive said character present and absent signals and said end character pair signal and connected to said scan counter to start to advance said scan counter at half rate in response to a first character present signal and then at full rate in response to a character absent signal and then at half rate in response to a second character present signal and terminating advancement of said scan counter upon receiving an end character pair signal whereby the value in said scan counter upon termination of advancement is indicative of character pitch;

means connected to said scan counter and responsive to predetermined scan counts in said scan counter for generating signals representing areas within character spaces; and logic test means connected to be conditioned by signals generated by said character area determining means and connected to said storage means to develop end-of-character signals in response to particular data bit patterns therein.

References Cited

UNITED STATES PATENTS

| | | | |
|---|---|---|---|
| 2,932,006 | 4/1960 | Glauberman | 340—146.3 |
| 3,234,511 | 2/1966 | Brust | 340—146.3 |
| 3,268,865 | 8/1966 | Berkin | 340—146.3 |
| 3,270,319 | 8/1966 | Schmid | 340—146.3 |
| 3,289,161 | 11/1966 | Gattner | 340—146.3 |
| 3,293,604 | 12/1966 | Klein | 340—146.3 |
| 3,305,832 | 2/1967 | Griffin | 340—146.3 |
| 3,305,835 | 2/1967 | Beltz | 340—146.3 |
| 3,111,646 | 11/1963 | Harmon | 340—146.3 |
| 3,164,806 | 1/1965 | Rabinow | 340—146.3 |
| 3,219,974 | 11/1965 | Rabinow | 340—146.3 |
| 3,234,511 | 2/1966 | Brust et al. | 340—146.3 |
| 3,303,466 | 2/1967 | Holt | 340—146.3 |
| 3,278,900 | 10/1966 | Wood | 340—146.3 |

THOMAS A. ROBINSON, Primary Examiner